US006222513B1

(12) United States Patent
Howard et al.

(10) Patent No.: US 6,222,513 B1
(45) Date of Patent: Apr. 24, 2001

(54) CHARGE RETENTION ISLANDS FOR ELECTRIC PAPER AND APPLICATIONS THEREOF

(75) Inventors: Matthew E. Howard, San Francisco; Robert A. Sprague, Saratoga; Edward A. Richley, Palo Alto, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/037,767

(22) Filed: Mar. 10, 1998

(51) Int. Cl.[7] ........................................... G09G 3/34
(52) U.S. Cl. ................... 345/84; 345/85; 345/86; 345/107; 359/296
(58) Field of Search ...................... 345/84, 85, 86, 345/48, 105, 107, 108, 109

(56) References Cited

U.S. PATENT DOCUMENTS

| 3,668,106 | * | 6/1972 | Ota ........................................ 358/305 |
| 4,126,854 |   | 11/1978 | Sheridon ............................. 340/373 |
| 4,143,103 | * | 3/1979 | Sheridon ................................. 264/4 |
| 4,438,160 | * | 3/1984 | Ishikawa et al. .................... 427/214 |
| 5,389,945 |   | 2/1995 | Sheridon ................................ 345/85 |
| 5,718,996 | * | 2/1998 | Iijima et al. ........................... 430/56 |
| 5,930,026 | * | 7/1999 | Jacobson et al. .................... 359/296 |

FOREIGN PATENT DOCUMENTS

WO 97 33267    9/1997  (WO) .
WO 97 50071   12/1997  (WO) .

OTHER PUBLICATIONS

Becker, James H., "Fast Laser Scanned Photo–Conductor Controlled Electrophoretic Display", Xerox Disclosure Journal, Jul./Aug. 1980, vol. 5, No. 4, pp. 411–413.

Chiang, A., Curry, D., and Zarzychki, M., "7.5/4:05 P.M.: A Stylus Writable Electrophoretic Display Device", *SID 79 Digest*, pp. 44 and 45.

Shiwa, S., Hoshino, Y., "5.6: Electrophoretic Display Method Using Ionographic Technology", NTT Human Interface Laboratories, Yokosuka, Japan, *SID 88 Digest*, pp. 61 and 62.

* cited by examiner

*Primary Examiner*—Steven Saras
*Assistant Examiner*—Fritz Alphonse
(74) *Attorney, Agent, or Firm*—Nola Mae McBain

(57) ABSTRACT

The invention is an electric paper sheet that uses a pattern of conductive charge-retaining islands on the outward-facing side of the first of two thin layers used to encapsulate a Gyricon sheet. The second encapsulating layer may also coated with a conductive material, or made of a conductive material, and may or may not be patterned. The Gyricon sheet and two encapsulating layers comprise a sheet of Gyricon electric paper on which images can be written and erased repeatedly. The patterned charge-retaining islands of the first encapsulating layer receive electric charges from an external charge-transfer device. After the charge-transfer device is removed, the conductive, charge-retaining islands hold electric charge, creating an electric field in the electric paper sufficient to cause an image change.

98 Claims, 16 Drawing Sheets

CHARGE RETENTION ISLANDS FOR ELECTRIC PAPER AND APPLICATIONS THEREOF

BACKGROUND

This invention relates to the use of electronic display materials for electric paper applications. The invention is designed for use with Gyricon electric paper but may also be used with electric paper based on liquid crystal, electrophoretic, and other field-effect display technologies.

Electric paper can be defined as any electronically-addressable display medium that approximates paper in form and function. Electric paper should be light-weight, thin and flexible, and it should display images indefinitely while consuming little or no power. In addition, electric paper should be re-usable. One must be able to erase images and create new ones repeatedly. Preferably, electric paper should display images using reflected light and allow a very wide-viewing angle.

One way to make electric paper possible using traditional electronic display technology is to completely remove the driving electronics from an electronic display package and use external addressing electrodes to write and erase images. This approach both reduces the per unit cost of electronic paper sheets and enables the use of cheap, flexible plastic films in place of glass plates for packaging. Multiple electronic paper sheets can then be addressed by a single set of external driving electronics, much like multiple sheets of pulp paper are printed on by a single printer.

A sheet and display system dubbed Gyricon is disclosed in various patents and articles, such as U.S. Pat. No. 4,126,854 by Sheridon titled "Twisting Ball Display." The Gyricon display system is comprised of an elastomeric host layer a few mils thick which is heavily loaded with rotating elements, possibly spheres, tens of microns in diameter. Each bichromal rotating element has halves of contrasting colors, such as a white half and a black half. Each bichromal rotating element also possesses an electric dipole, orthogonal to the plane that divides the two colored halves. Each bichromal rotating element is contained in its own cavity filled with a dielectric liquid. Upon application of an electric field between electrodes located on opposite surfaces of the host layer, the rotating elements will rotate depending on the polarity of the field, presenting one or the other colored half to an observer.

A Gyricon sheet has many of the requisite characteristics of electric paper, namely, bistable image retention, wide viewing angle, thin and flexible packaging, and high reflectance and resolution. U.S. Pat. No. 5,389,945 issued to Sheridon on Feb. 14, 1995, and titled "Writing System Including Paper-Like Digitally Addressed Media and Addressing Device Therefor", describes an electric paper printing system that employs independent, external addressing means to put images on the Gyricon sheets. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the polarity of the electric fields. The patent recognizes that fringing fields in the vicinity of the addressing electrodes cause incomplete or excessive rotation of the imaging elements in the sheet, and it describes a method for solving this problem.

FIG. 1 shows a representation of the fringing field problem described in the '945 patent. A Gyricon sheet comprised of a plurality of bichromal rotating elements, in this case spheres, cast in a retaining medium 100 is contained between a first encapsulating layer 102 and a second encapsulating layer 104. The sheet 100 and encapsulating layers 102, 104 are placed in proximity to a supporting back plane 106 that is electrically grounded. An external addressing device 108 connected to a power supply 110 is depicted moving across the sheet in a direction D. Electric field lines 112 are shown in the proximity of the external addressing device 108 and bichromal spheres 126, 132, 138 within the electric field 112 are rotated to positions such that the planes that separate their black hemispheres 128, 134, 140 and white hemispheres 130, 136, 142 are orthogonal to the field lines 112. Note that a bichromal sphere 120 that was previously within the electric field 112 maintains a position similar to the bichromal sphere 126 in the trailing edge of the electric field 112. Optical properties of both of the bichromal spheres 120, 126 are not optimal because of their over-rotated orientations. A bichromal sphere 144 not yet affected by this electric field 112 rests in a state where its optical properties are optimized because its white hemisphere 146 is positioned precisely toward an encapsulating layer 102 which is also a viewing window.

FIG. 2 shows a representation of the return-to-zero effect, a problem not heretofore described, that limits the ability to address Gyricon sheets with external addressing devices as described in the '945 patent. A Gyricon sheet comprised of a plurality of bichromal rotating elements cast in a retaining medium 200 is contained between a first encapsulating layer 202 and a second encapsulating layer 204. The sheet 200 and encapsulating layers 202, 204 are placed in proximity to a supporting back plane 206 that is electrically grounded. An external addressing device 208 connected to a power supply 210 is depicted moving across the sheet in a direction D. Each bichromal sphere 220, 226, 232 is contained in its own liquid-filled cavity 221, 227, 233 within the retaining medium 200. Positive mobile ionic charge 240 and negative mobile ionic charge 242 are present in the liquid-filled cavity as well. An electric field exists directly between the external addressing device 208 and the equipotential surface 206 that causes the local bichromal sphere 226 to rotate and mobile ionic charges 240, 242 to separate within the cavity 227. In cavities 221 of regions trailing the path of the external addressing device and no longer under the influence of an external electric field, yet separated mobile ionic space charges create an electric field opposite to the previously applied field which imparts torque on the bichromal rotating elements 220 contained therein. This torque can dislodge the bichromal sphere 220 from its intended position, determined by the external addressing device, leaving its black half 224 and white half 222 in optically-poor position for viewing.

Another issue, heretofore undisclosed, facing electric paper printing systems is that sheets, once printed on by some external addressing device, are subject to inadvertent tribo-electric writing. In the described electric paper printing system, images are produced willfully by an external addressing device that has the ability to create electric fields. Electric charge applied inadvertently by tribo-electric exchanges during handling can equally create electric fields that cause image change. This effect poses a threat to image retention and stability. It should be emphasized that this significant problem is a threat to any electric paper technology which uses field-addressed electric paper sheets including Gyricon, liquid crystal and electrophoretic technologies.

A final issue facing the use of external addressing devices on electric paper sheets is that one-dimensional external addressing devices are limited in how quickly they can print an image on an entire sheet by the response speed of optical display elements. In Gyricon sheets, complete rotation of bichromal rotating elements is only achieved if the addressing electric field is held at least as long as the required rotation time, on the order of 100 milliseconds. For a sheet on which many rows of an image must by printed it would take many seconds or minutes to display an entire image.

Another issue facing electric paper is the difficulty of producing color versions. U.S. Pat. No. 5,717,515 by Sheridon issued Feb. 10$^{th}$, 1998 and titled "Canted Electric Fields for Addressing a Twisting Ball Display" describes several methods for making highlight color and full color versions of a gyricon sheet and display. These systems all require multi-segmented spheres instead of bichromal spheres. That is the rotational elements needed to implement a color system have at least three different segments instead of the two segments used in the bichromal spheres. While production of multi-segmented spheres is possible the fabrication techniques needed are more complex and therefor the multi-segmented spheres are more difficult to manufacture than bichromal spheres. Additionally, these implementations use the complex addressing techniques of canted fields, multi-threshold multipass addressing or addressing requiring multiple electrode addressing layers. Canted field addressing requires the generation of electric fields that are not substantially perpendicular to the viewing surface while multi-threshold multipass addressing requires the usage of spherical elements which rotate when different strengths of electric fields are applied. In short, all of these systems are more complex and more difficult to implement than typical gyricons using bichromal rotational elements.

The present invention provides an improved means of implementing the printing system described in U.S. Pat. No. 5,389,945. The invention provides an alternative solution to the fringing field problem as well as addressing the problems of the return to zero effect, inadvertent tribo-electric writing, and limited scanning speeds. Futhermore, this invention provides a method for implementing improved grey scales, highlight color, and full color gyricons which use only simpler bichromal elements and do not require rotating elements which respond to different electric fields or canted field addressing.

Further advantages of the invention will become apparent as the following description proceeds.

SUMMARY OF THE INVENTION

Briefly stated and in accordance with the present invention, there is provided an electric paper sheet that uses a pattern of conductive charge-retaining islands on the outward-facing side of the first of two thin layers used to encapsulate a Gyricon sheet. The second encapsulating layer is also coated with a conductive material, or made of a conductive material, and may or may not be patterned. The charge-retaining islands of the patterned side or sides receive electric charges from an external charge-transfer device. The external charge-transfer device could have a plate configuration and be held over and in contact with the sheet, it could have a wand configuration and be pulled across the sheet, or it could have a stylus configuration and be used like a pen or pencil. After the charge-transfer device is removed, the conductive, charge-retaining islands hold electric charge, creating an electric field in the electric paper of sufficient magnitude and duration to cause an image change.

While the present invention will be described in connection with a preferred embodiment and method of use, it will be understood that it is not intended to limit the invention to that embodiment and procedure. On the contrary, it is intended to cover all alternatives, modifications and equivalents as may be included within the spirit and scope of the invention as defined by the appended claims.

DETAILED DESCRIPTION OF THE INVENTION

Figure 3:
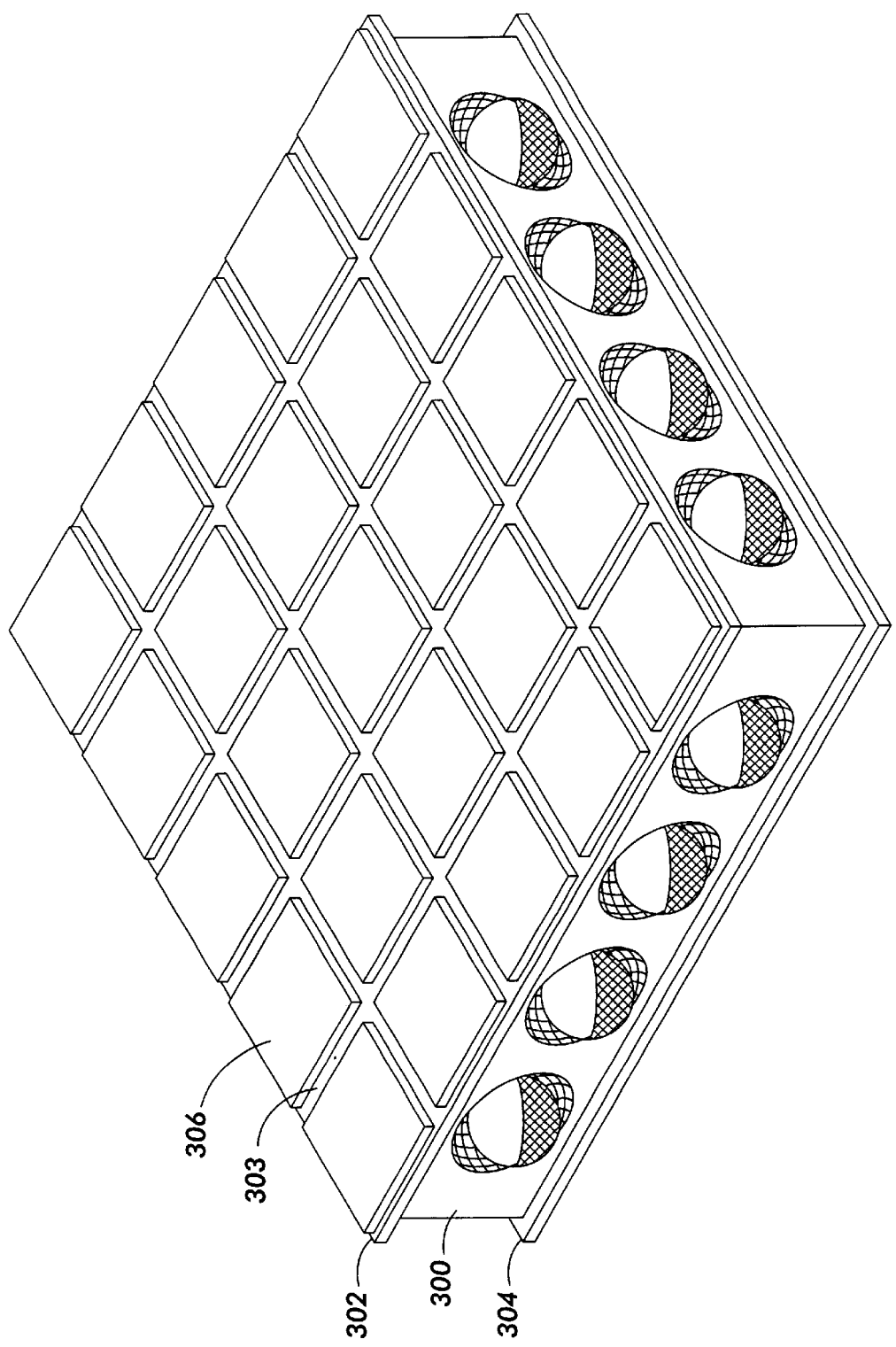
FIG. 3 is a top view of a gyricon sheet, according to the present invention, illustrating charge retention islands.

Turning now to FIG. 3 a gyricon sheet, according to the present invention, is shown. The gyricon sheet is comprised of the following elements: a sheet 300, a first encapsulating layer 302 patterned with conductive charge-retaining islands 306, and a second encapsulating layer 304 that may or may not be patterned with charge-retaining islands.

Together, the first encapsulating layer 302 and the second encapsulating layer 304 must do the following things: indefinitely contain a sheet 300, provide at least one transparent window through which the sheet 300 can be viewed, provide at least one external surface patterned with charge retaining islands 304 that can be addressed with an external charge transfer device. The first encapsulating layer 302 and second encapsulating layer 304 could take the form of thin plastic sheets that are sealed or fastened around the perimeter of the sheet 300. The second encapsulating layer 304 need not be entirely separate from the first encapsulating layer 302. The second encapsulating layer 304 could simply be an extension of the first encapsulating layer 302, folded over and around the edge of the sheet and then sealed or fastened around the remaining perimeter. The first encapsulating layer 302 and second encapsulating layer 304 could also take the form of a coating, applied by spraying, doctoring, or some other method to hold the contents of the sheet 300.

FIG. 3 shows a pattern for the charge retaining islands 306 of the outer surface of the first encapsulating layer 302. Charge-retaining islands 306 have square perimeters and are organized in a simple two-dimensional x-y matrix. Narrow channels 303 of insulating material separate the charge-retaining islands 306. The channels 303 serve to isolate the charge-retaining islands 306, preventing migration of charge laterally across the encapsulating sheet, and should be small with respect to the charge-retaining islands 306, so that the maximum possible area of the display is covered with conductive charge-retaining material. Channels 303 must not become so small, though, that they fail to prevent significant charge leakage from the charge-retaining islands 306. Even if island-channel proportions are properly designed, in practice, dirt and accumulated debris can provide conduction paths across channels. Therefore, it is important to keep the surface of the patterned encapsulating layers clean.

When implementing a regular two-dimensional pattern of charge retaining islands such as the one in FIG. 3, it is critical that the pitch of electrode elements of an external charge transfer device, to be described hereafter, be compatible with the pitch of the charge-retaining islands 306 of the pattern to avoid moiré effects, ie: the pitch of the external charge transfer device should preferably be an integral multiple or fractional of the charge retaining island spacing. The external charge transfer device can indiscriminately charge all of the conductive islands to erase or clear the page. Alternatively, the external device can be programmed to charge only individual islands or groups of islands to write a bit-wise image.

Figure 4:
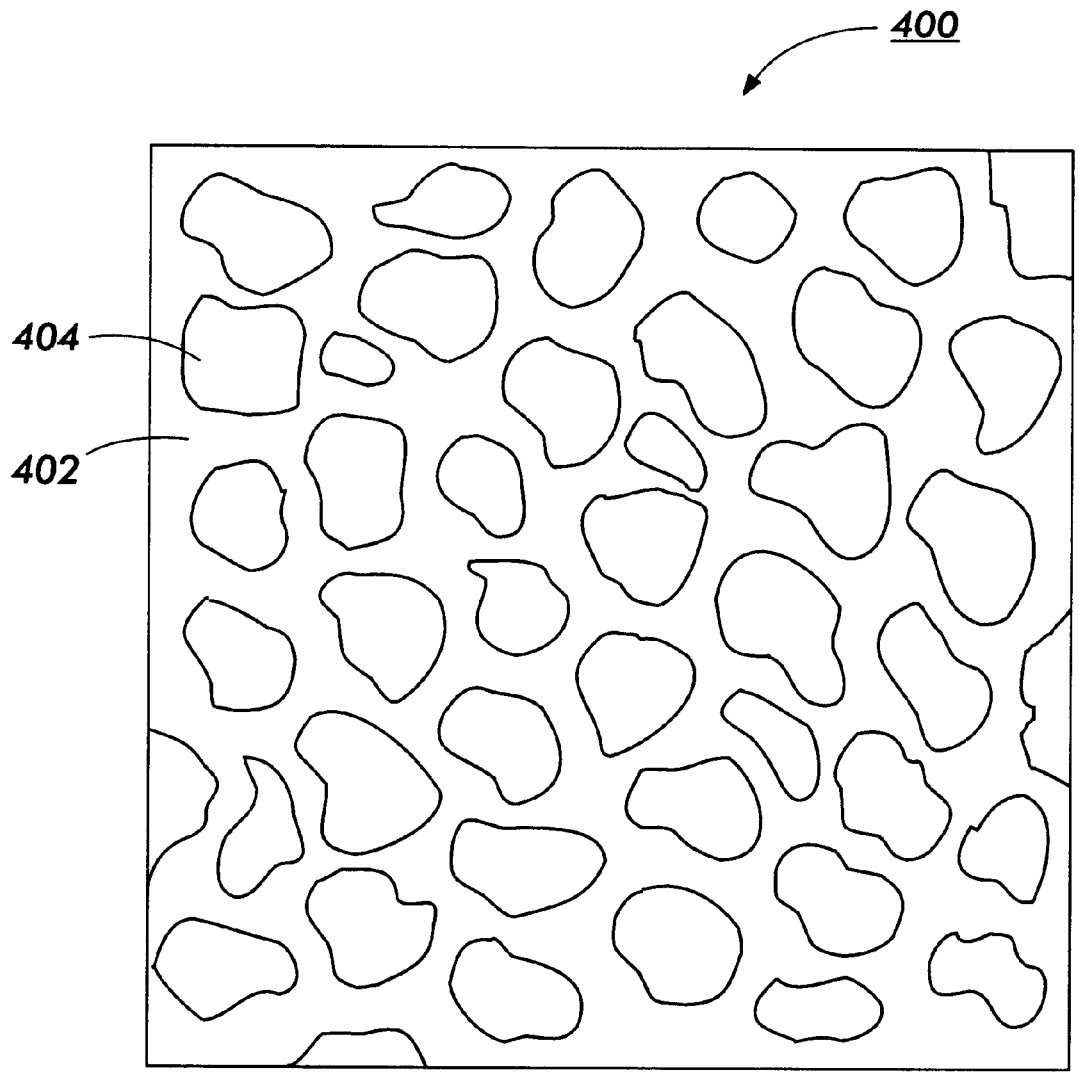
FIG. 4 is a top view of a gyricon sheet, according to the present invention, illustrating an alternate embodiment of charge retention islands.

FIG. 4 simply illustrates a second possible embodiment of a charge-retaining island pattern that utilizes a random array. The top view of the first encapsulating layer 400 shows randomly oriented charge retaining islands 404 separated by channels 402. Charge retaining islands 404 must still be relatively large compared to the channels 402, but in such a random distribution, both feature sizes must be much smaller than the pixel size of a displayed image. Pixel size is determined by the size or range of addressing elements of an external charge transfer device independently of the size of the charge retaining islands 404. The charging array need not be registered or aligned perfectly with the pattern, though, because large groups of islands are charged by each addressing element and moiré' effects are negated by the randomness of the island pattern.

Figure 5:
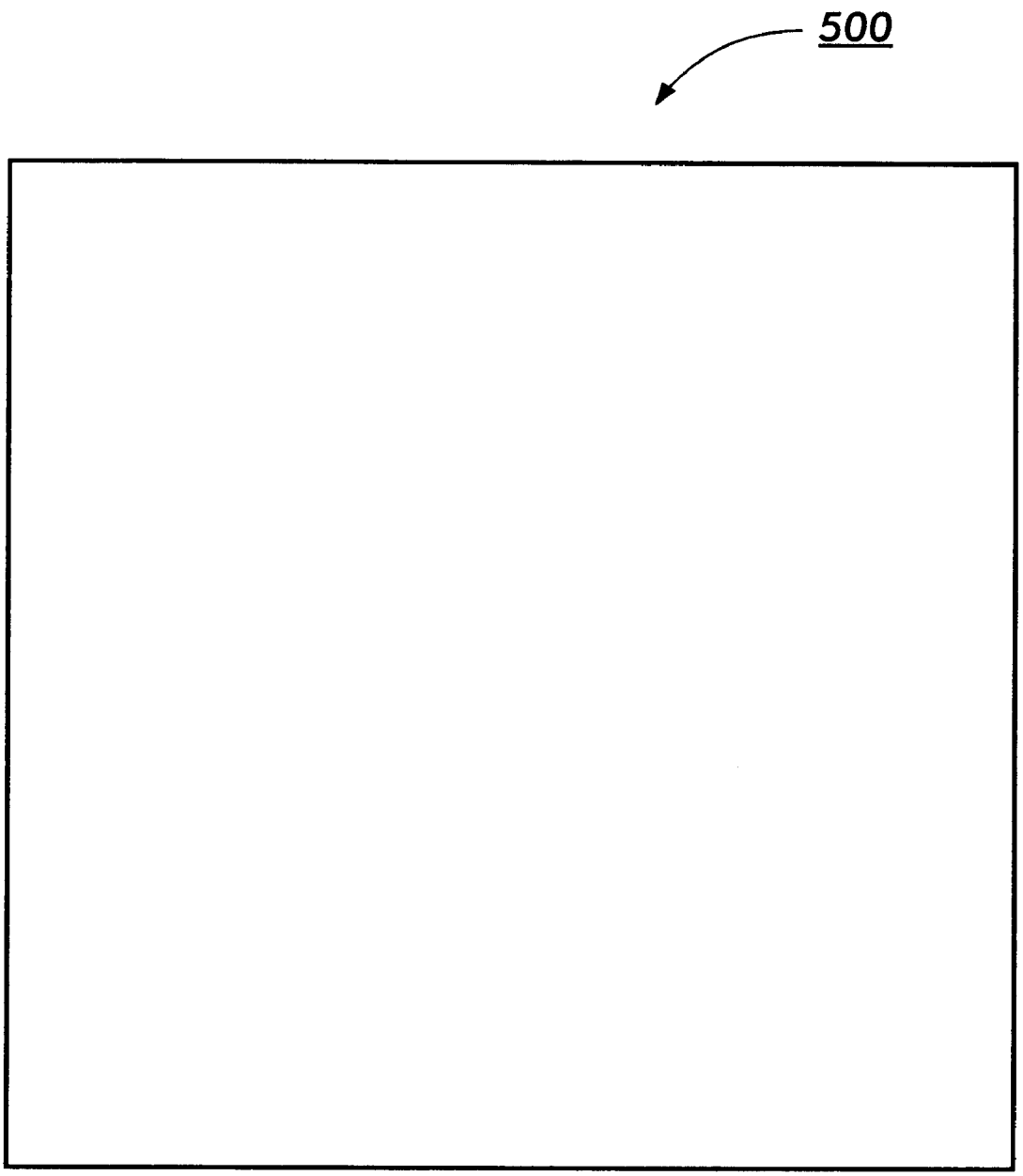
FIG. 5 is a bottom view of a gyricon sheet, according to the present invention, illustrating an equipotential surface.

FIG. 5 shows an embodiment for the second encapsulating layer 500. It is, conductive, but not patterned with charge retaining islands. The second encapsulating layer 500 is made of conductive material or coated with conductive material on either its inner or outer surface. The second encapsulating layer 500 is not patterned, but rather remains laterally conductive across at least one of its entire surfaces. In this form, the second encapsulating layer 500 can serve not only as an equipotential surface, but as a very effective tribo-shielding layer that provides protection from inadvertent tribo-writing.

Figure 6:
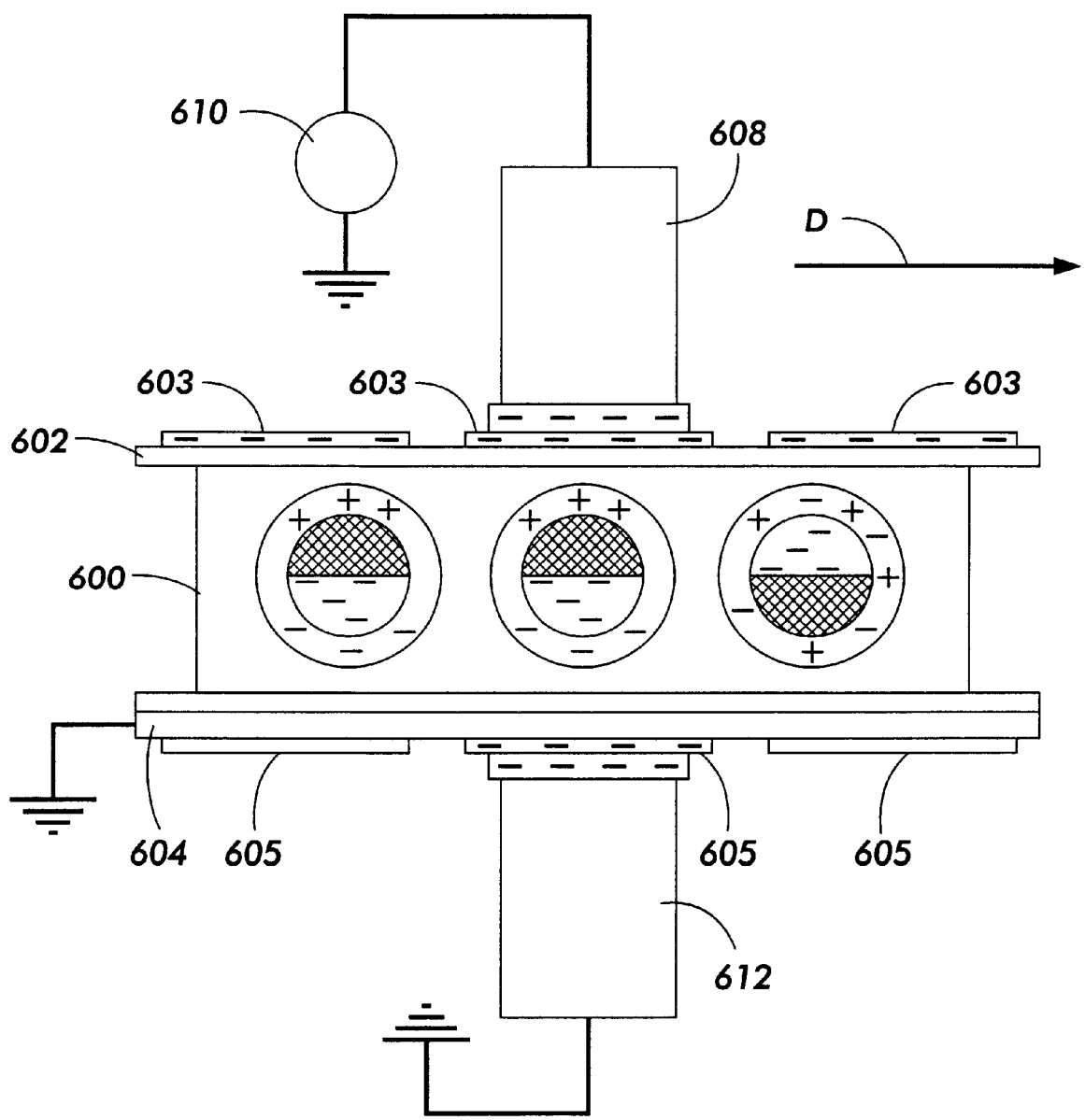
FIG. 6 is a side view of a gyricon sheet, according to the present invention with two external charge transfer devices.

The second encapsulating layer 500 can also be patterned using either an organized array of charge retaining islands or a random array of charge retaining islands such as shown for the first encapsulating layer in FIGS. 3 and 4. For the best performance, such a pattern would have to face outward from the sheet and be addressed by a second external charge transfer device while a first charge transfer device addresses the pattern on the first encapsulating layer such as shown in FIG. 6. FIG. 6 shows a Gyricon sheet comprised of a plurality of bichromal rotating elements cast in a retaining medium 600 that is contained between a first encapsulating layer 602 with a pattern of charge retaining islands 603 and a second encapsulating layer 604 with a pattern of charge retaining islands 605. An external charge transfer device 608 connected to a power supply 610 is depicted moving across the sheet in a direction D over the first encapsulating layer 602 while a second external charge transfer device 612 is connected to ground and is depicted moving across the second encapsualting layer 604 in tandem with the first external charge transfer device 608.

However other addressing schemes are also possible. In particular, the patterning of the second encapsulation layer can be arranged to have non-adjacent segments electrically connected together. In this manner non-contiguous regions can be simultaneously selected to be addressed by the charge transfer device on the first encapsulating layer while preventing addressing of those regions not selected.

The second charge transfer device would enhance writing performance by controlling the electric potential on the second encapsulating layer 604. In this mode of operation, it would be preferable to use a random array on the second encapsulating layer 604 so that registration and alignment of the charge retaining island patterns 603, 605 on the first and second encapsulating layers 602, 604 and both external charge transfer devices 608, 612 is simplified.

The second encapsulating layer can also be implemented without any conductive properties. However, a non-conductive second encapsulating layer would only serve to contain the sheet. It would not provide any protection from inadvertent tribo-writing. When using a non-conductive second encapsulating layer, an external electrically grounded back plane (not shown) must be used, such as an adjacent grounded metal plate, for the best writing performance.

The sheet itself can be constructed by techniques already known in the art. The charge retaining islands can be created on or in an encapsulating layer by many means with any conductive material. One technique, which has been tested, creates islands of conductive and transparent Indium Tin Oxide (ITO) on a transparent polyester film. The polyester is coated with a very thin layer of ITO, and then channels are etched in the ITO by photolithographic processes well known in the art. The remaining conductive ITO regions act as charge retaining islands, while insulating channels are created by the underlying polyester. An encapsulating layer of polyester patterned with ITO islands of 0.090" on an edge and 0.010" channels has been demonstrated. Extending the process to develop patterns with 0.003" to 0.005" channels and island edge dimensions of 0.015" to 0.025" is straight-forward. Still higher resolution can be achieved using other patterning processes and technologies well known in the art. Any metal, such as chrome or aluminum, applicable in thin films and patternable by lithographic processes could be used in place of the ITO. Many plastic materials, such as PVDC and polyethylene, are possible candidates for a substrate on which to build the islands.

Charge retaining islands may also be created as part of the bulk of an encapsulating layer. If conductivity of the charge retaining islands is extended through the bulk of the encapsulating layer to the sheet contained therein, sheet performance could be enhanced by resultant strengthening of the electric field created by a given addressing voltage. Z-axis only conductive materials exist that are comprised of an insulating host material doped with conductive particles that transmit charge in only one axis. An encapsulating layer of such a material would essentially provide a very high-resolution conductive charge retaining island pattern.

An impermeable coating could also used that would be applied with conductive particles preferentially distributed to create a bulk conductive charge retaining island pattern. Likewise, two coating materials, one conductive and one insulating, could be applied to a sheet to create a conductive charge retaining island pattern.

The charge-retaining island pattern, whether created on the first encapsulating sheet or the second encapsulating sheet or both, serves as an electroreceptor grid for an external charge transfer device. By retaining charge, the islands provide a buffer mechanism to maintain an electric field for an extended period of time, theoretically forever, in the absence of some external addressing device. In practice, conductive islands do not retain charge indefinitely because some charge leaks off across the dielectric channels and down into the bulk material. Subsequently, electric fields are not really applied permanently, but simply held long enough to effect the desired image change. The buffering provided by the charge-retaining islands has several significant effects on the performance of the electric paper display.

First, the charge-retaining islands decouple required residence time of the external charge transfer device from the speed of optical elements. Rotating elements in a Gyricon sheet rotate completely in tens to hundreds of milliseconds, so an addressing electric field must be held at least this long. To print an image of many hundreds of rows would take many seconds, or even minutes, if the addressing device must reside for the entire rotation time at each row. With a charge retaining island pattern providing a 'buffer', an external charge transfer device can be scanned at an arbitrarily fast rate.

Figure 7:
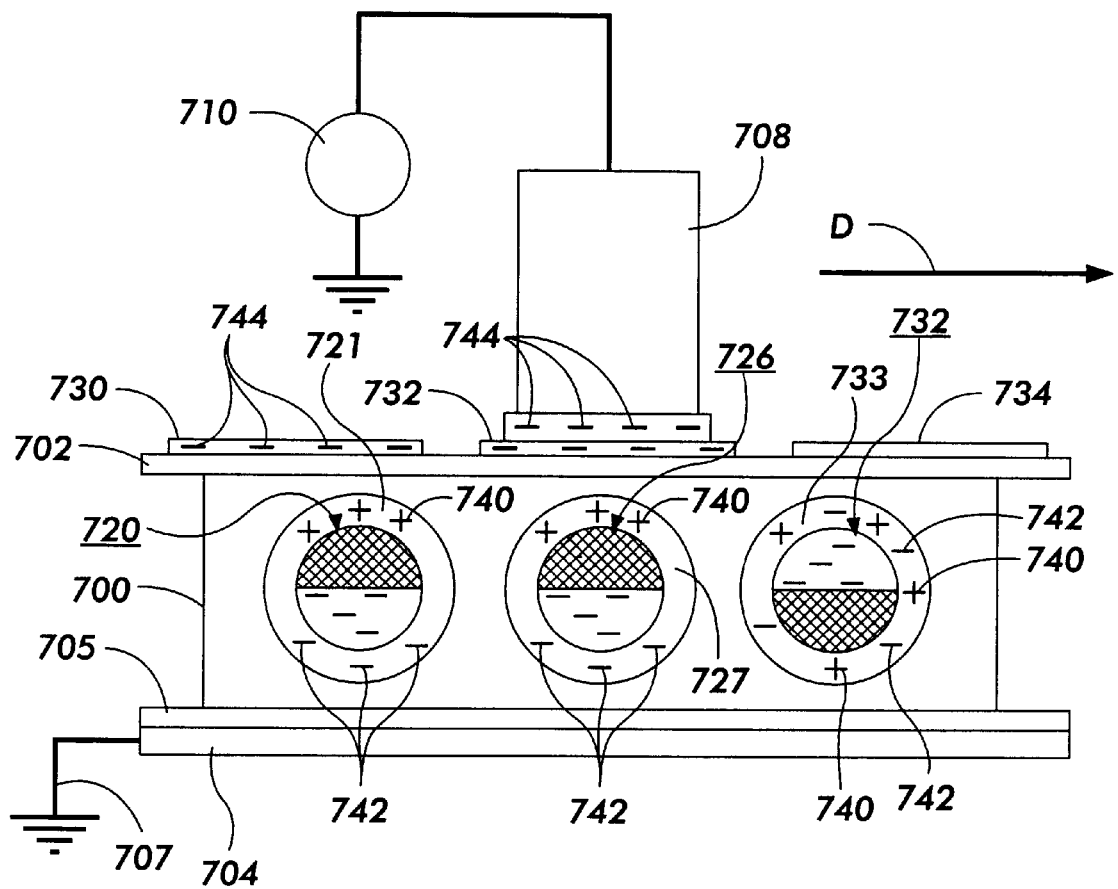
FIG. 7 is a side view of a gyricon sheet, according to the present invention, illustrating control of mobile ionic charges by charge retaining islands.

Second, the charge-retaining islands solve the return-to-zero effect earlier described. FIG. 7 shows a Gyricon sheet comprised of a plurality of bichromal rotating elements cast in a retaining medium 700 that is contained between a first encapsulating layer 702 and a second encapsulating layer 704 that has a conductive coating 705 that is electrically grounded 707. An external charge transfer device 708 connected to a power supply 710 is depicted moving across the sheet in a direction D. Each bichromal rotating element 720, 726, 732 is contained in its own liquid-filled cavity 721, 727, 733 within the retaining medium 700. Positive mobile ionic space charges 740 and negative mobile ionic space charges 742 are present in the liquid-filled cavities 721, 727, 733 as well. The external charge transfer device 708 has passed by and transferred charge 744 to one charge retaining island 730, is passing by and transferring charge 744 to another charge retaining island 732, and has yet to address a third charge-retaining island 734. The bichromal rotating element 720 that rests within the electric field created by the previously addressed charge retaining island 730 is fully rotated, the mobile ionic space charges 740, 742 are still polarized in the cavity 721 due to the retained charge 744 on charge retaining island 730, and the image created by the charge transfer device 708 is intact and will theoretically last forever. In practice, charge will leak off the charge-retaining island 730 and the cavity will slowly depolarize. Depolarization is slow enough so that the net torque on the ball created by the depolarization at any one time is not enough to rotate it out of position.

It should be noted that the charge transfer process is depicted in FIG. 7 as transferring negative charges to the charge retaining islands 730, 732. That is, the voltage source 710 is at a potential lower than that of ground and this causes a specific orientation of the bichromal rotating element. When the opposite orientation of the element is desired, voltage source 710 will be at a potential higher than ground and will transfer positive charges to the charge retaining islands. Voltage source 710 can be any source, such as a switched DC source, so long as it is capable of providing the required voltage differentials to cause rotation of the bichromal rotating elements. Further, the second encapsulating layer 704 does not have to be grounded, it can rest at any voltage so long as the voltage source 710 is capable of producing the required voltage differentials both above and below that voltage to cause rotation of the bichromal rotating elements. In practice, voltage differentials of at least, approximately 50 volts are required, however, the exact voltage will be dependent on the precise system constructed.

Figure 1:
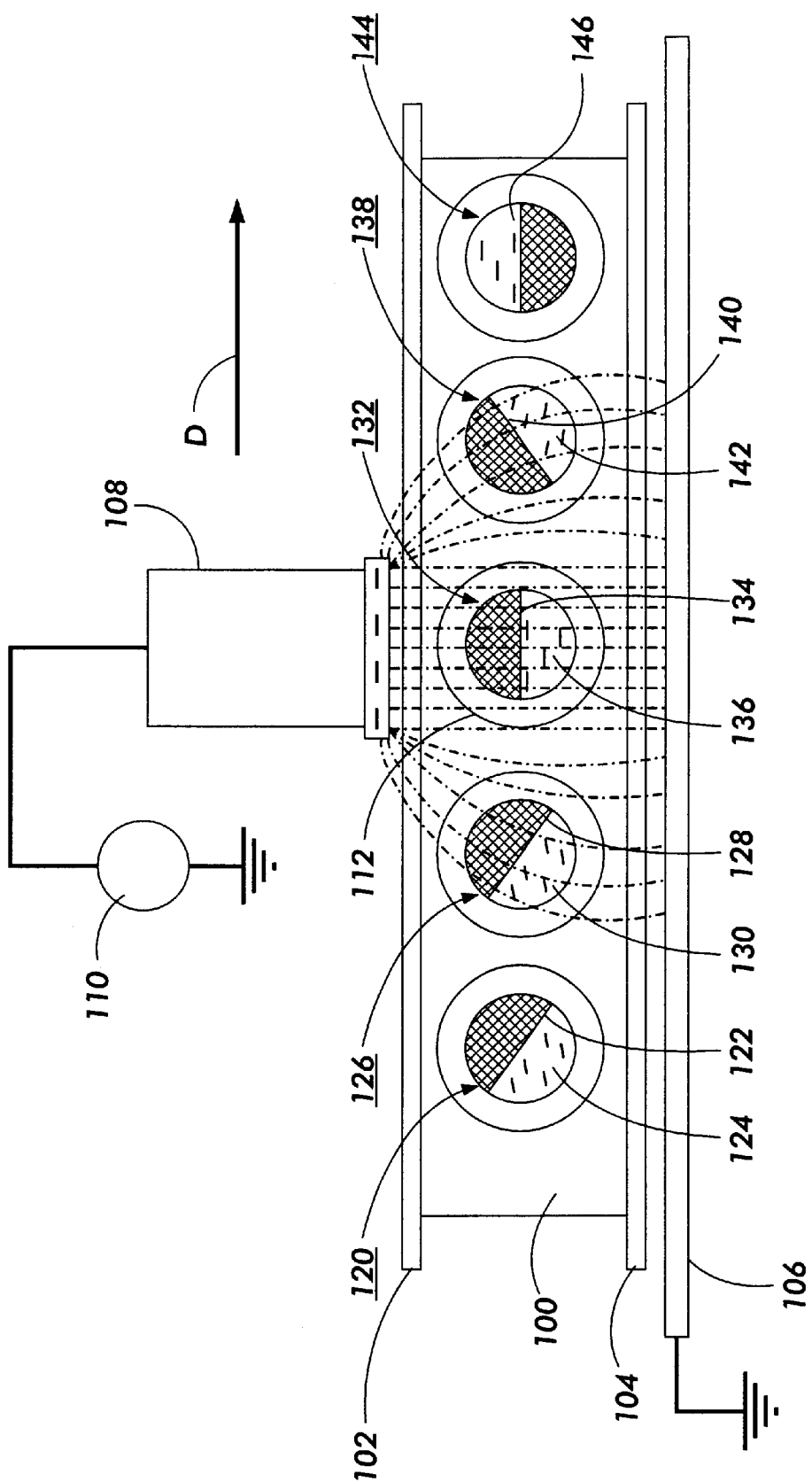
FIG. 1 is a side view of a prior art construction of a gyricon with an external writing device illustrating a fringing field effect.
Figure 2:
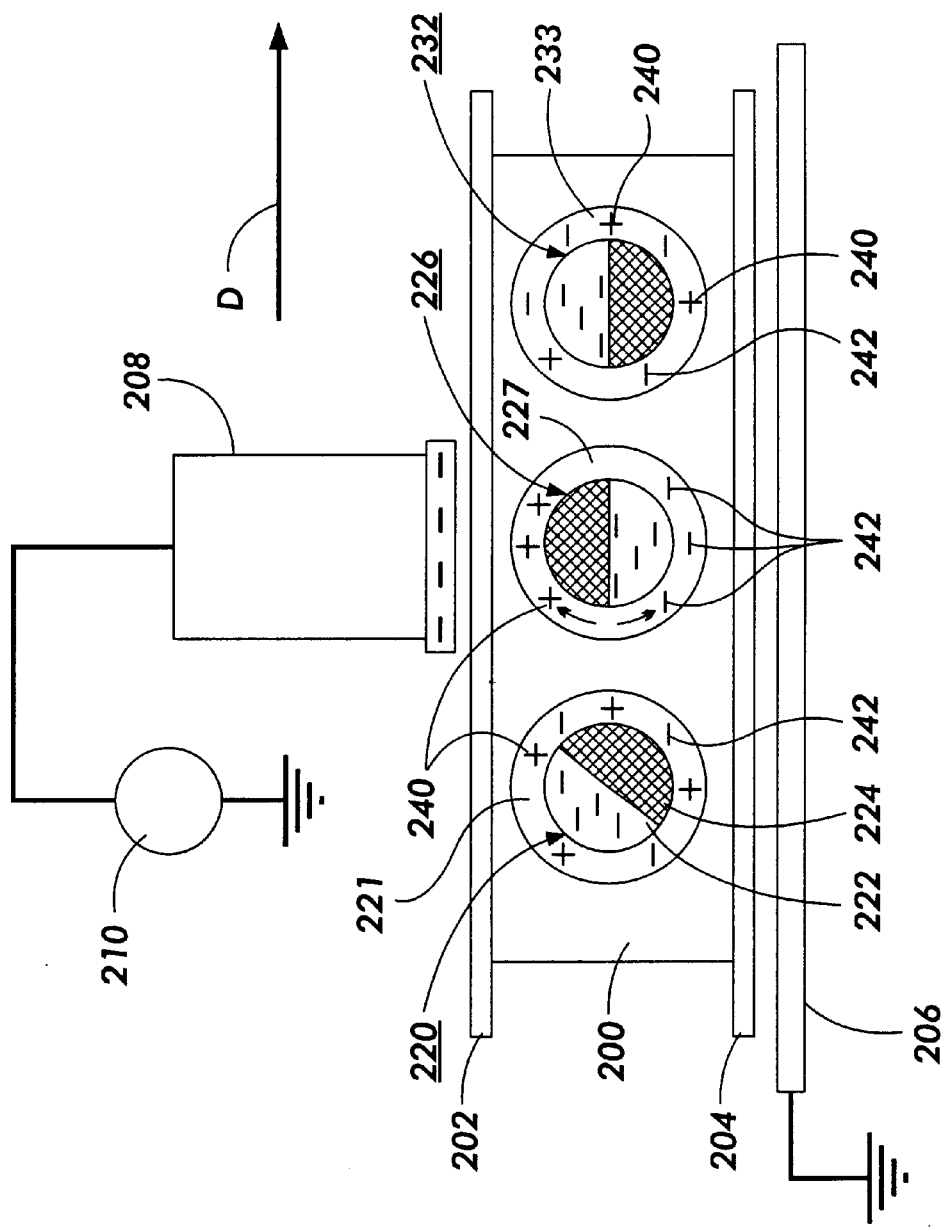
FIG. 2 is a side view of a prior art construction of a gyricon with an external writing device illustrating a return to zero effect.
Figure 8:
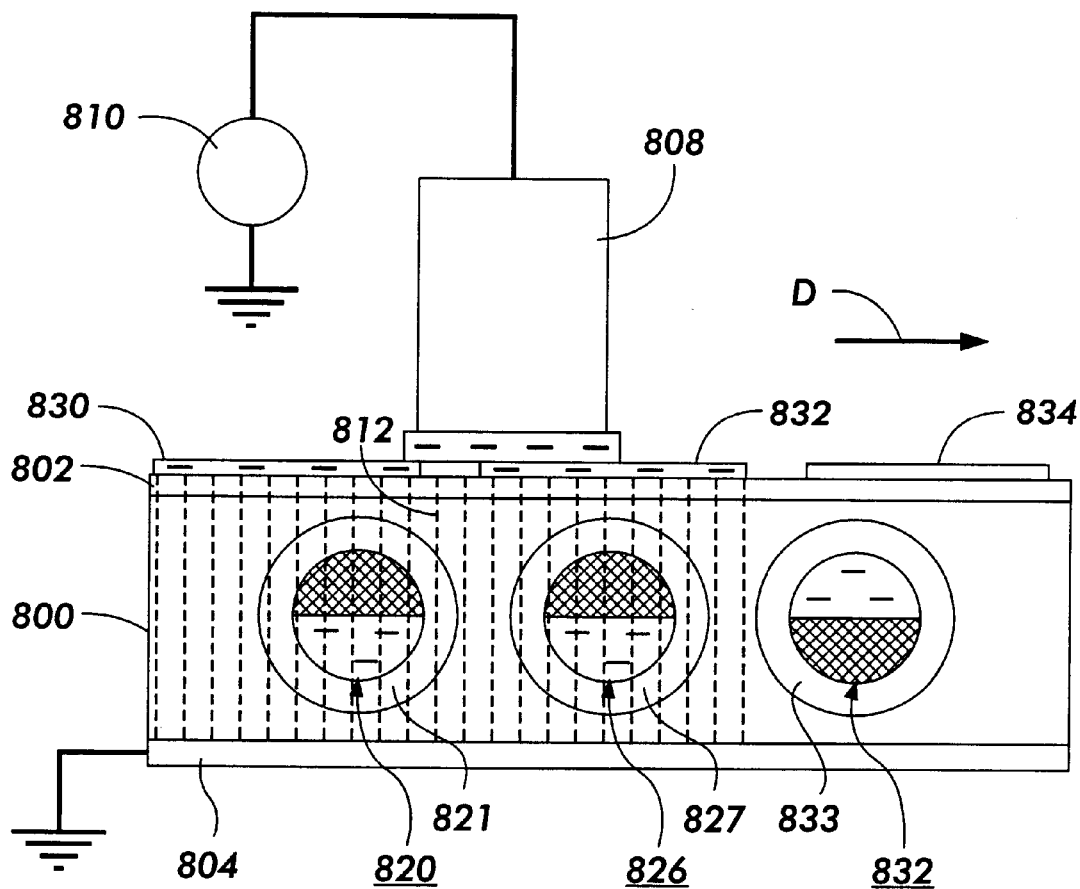
FIG. 8 is a side view of a gyricon sheet, according to the present invention illustrating retained electric fields.

Third, the charge retaining islands provide an alternate solution to the fringing field effect described earlier. FIG. 8 shows a Gyricon sheet comprised of a plurality of bichromal rotating elements cast in a retaining medium 800 that is contained between a first encapsulating layer 802 and a second encapsulating layer 804 that is made of conductive material and is electrically grounded. An external charge transfer device 808 connected to a power supply 810 is depicted moving across the sheet in a direction D. Each bichromal rotating element 820, 826, 835 is contained in its own liquid-filled cavity 821, 827, 833 within the retaining medium 800. The external charge transfer device 808 has passed by and transferred charge to one charge retaining island 830, is passing by and transferring charge to another charge retaining island 832, and has yet to address a third charge-retaining island 834. Electric field lines 812 emanate primarily from the charge-retaining islands orthogonal to the equipotential surface 804, not from the external charge transfer device 808 as would happen in the absence of the charge retaining islands (as shown in FIG. 2). Bichromal rotating elements 820, 826, which have been addressed, are fully rotated and have not been significantly affected by fringing fields of the external charge transfer device 808. The charge retaining islands 830, 832 have allowed the bichromal spheres 820, 826 to completely rotate and remain completely rotated after the charge transfer device 808 has left the vicinity.

The charge retaining islands solve a fourth problem, one that is not directly related to their role as an addressing buffer, but one that is related to their electrically conductive properties. The conductive charge-retaining island pattern acts a tribo-shielding layer which protects images from inadvertent tribo-writing. Indadvertent tribo-writing is a phenomena that threatens image retention for any electric paper based on field-effect display technology including Gyricon, liquid crystal and electrophoretic technologies. As described earlier, an electric charge applied inadvertently by tribo-electric exchanges during handling can create electric fields that cause image change. It has been observed that Gyricon material having a polyester encapsulating sheet patterned with ITO charge-retaining islands does not react with significant image changes when handled as does Gyricon material not so protected.

An external charge transfer device must also be chosen to work with a charge retaining island pattern. Two suitable mechanisms have been identified for transferring charge to charge retaining islands. The first is contact charging, whereby, a mechanical contact is made between conductive contact elements of an external addressing array and the conductive charge retaining islands. When in contact, charge is transferred across the interface bringing the charge retaining islands to the same electric potential as the contact elements. Charge remains on the charge retaining islands, maintaining a voltage and an electric field in the sheet, well after contact is broken and the contact elements are removed from the writing area as shown in FIGS. 7 and 8. Ionographic technology, well known in the art, represents another possible charge transfer mechanism that does not rely on mechanical contact to the islands Ionographic elements create a controlled flow of ions from a corona discharge source that can be directed precisely to spots on a nearby surface, such as the charge retaining islands of the present invention.

Figure 9:
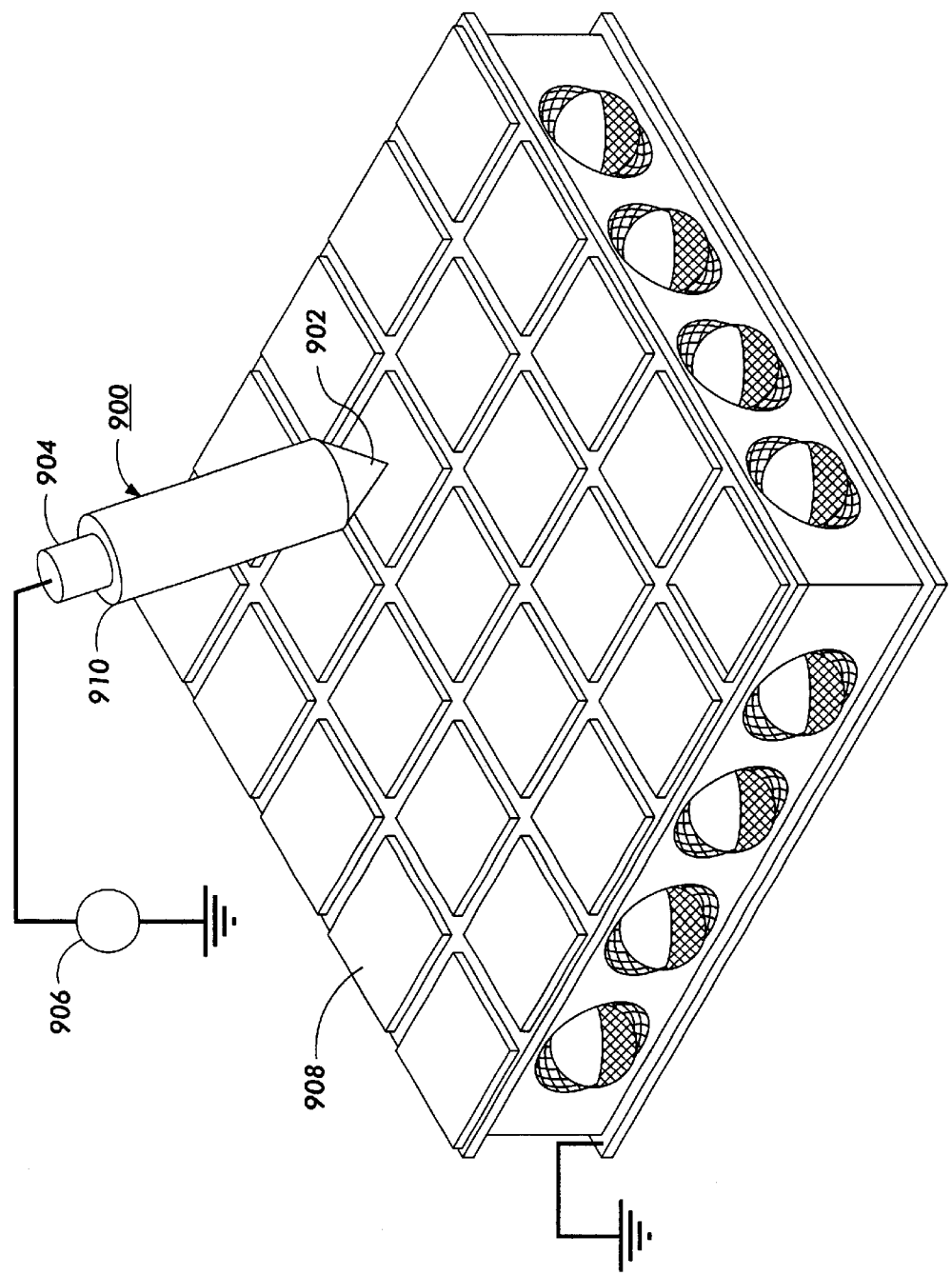
FIG. 9 is a perspective view of a gyricon sheet, according to the present invention, showing a point charge transfer device.

Various mechanical arrangements are envisioned for external charge transfer devices that utilize either of the above charge transfer mechanisms. A single element stylus, such as the one shown in FIG. 9, could be utilized like a pen or pencil. The illustrated stylus 900, which uses the contact transfer mechanism, has been demonstrated. A soft, conductive tip 902 is used to make contact with charge retaining islands 908. The tip is connected by a conductive core 904 to a power supply 906. The conductive core 904 is surrounded by insulating material 910 that allows a user to handle the stylus without threat of electric shock. A single element ionographic stylus is also plausible.

Figure 10:
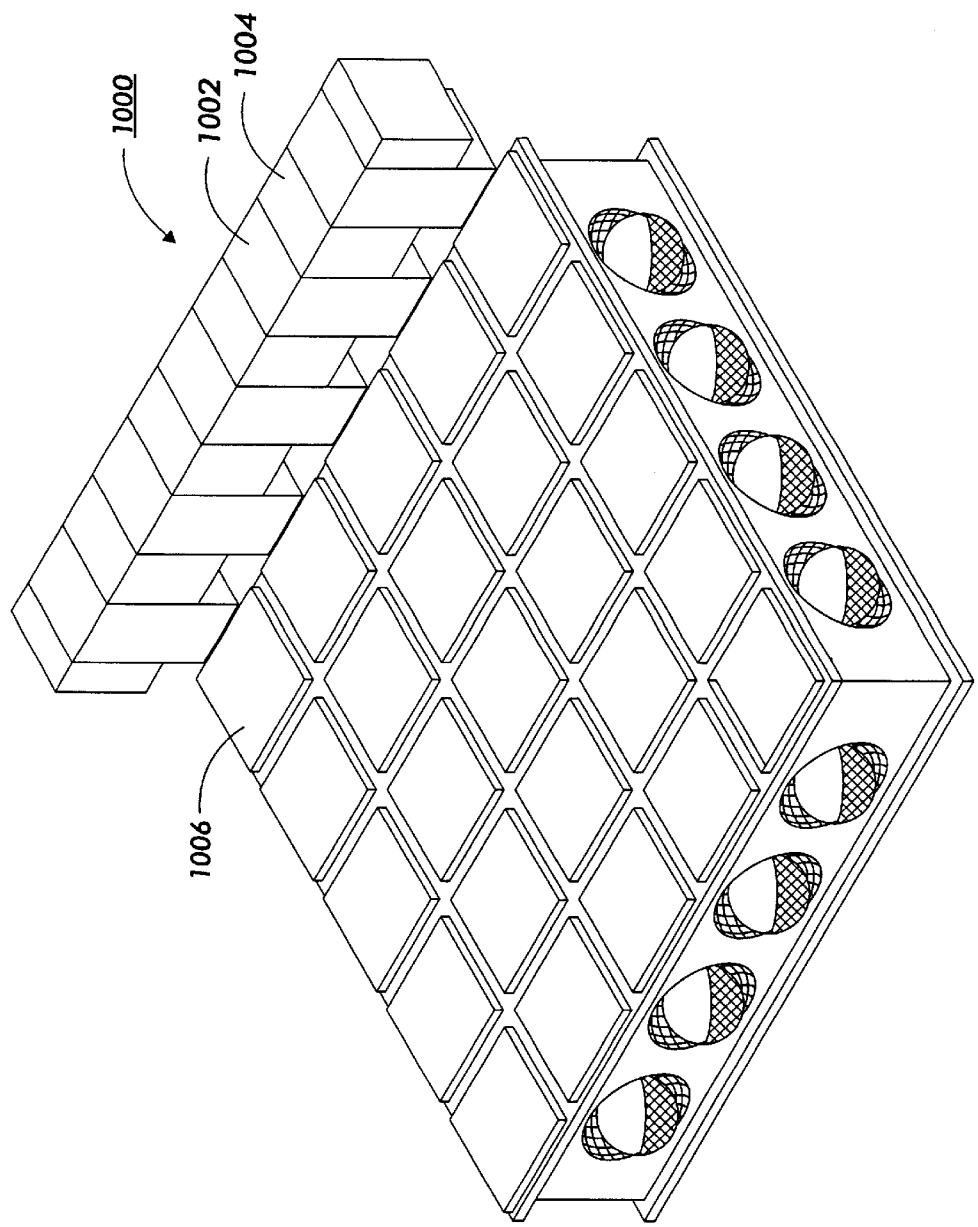
FIG. 10 is a perspective view of a gyricon sheet, according to the present invention, showing an arrayed charge transfer device.

A one-dimensional array of charge transfer elements could also be built and used like a print head or wand. FIG. 10 shows such a one-dimensional array that uses the contact charging mechanism. This contact charging wand 1000 is comprised of alternating conductive charge transfer elements 1002 and insulating elements 1004. The charge transfer elements must make reliable contact to the charge-retaining islands 1006 while moving with respect to the electric paper sheet during image generation. Arrays using springy wire electrodes soldered to the edge of a printed circuit board have been demonstrated. More robust arrays utilizing anisotropically conductive elastomer connectors, or zebra connectors, well known in the art are also possible. A one-dimensional array of ionographic addressing elements, well known in the art, is also a possibility for an external charge transfer wand.

The alignment of the array with the charge retaining islands need not be "perfect" as is shown in FIG. 10. It is simply necessary for each element to contact an island. For optimal alignment performance the array may have the same pitch as the islands, as shown in FIG. 10. However, individual array elements might transfer charge to a multiple number of charge retention islands. Further, individual array elements might be smaller than individual charge transfer islands but spaced at the same pitch as the charge transfer islands allowing for some tolerance in alignment between the individual array elements and the charge transfer islands. In all of these cases, the pitch of the elements in the charge transfer device should preferably be an integral number or fraction of the pitch of the charge transfer islands to avoid the creation of moire effects.

Figure 11:
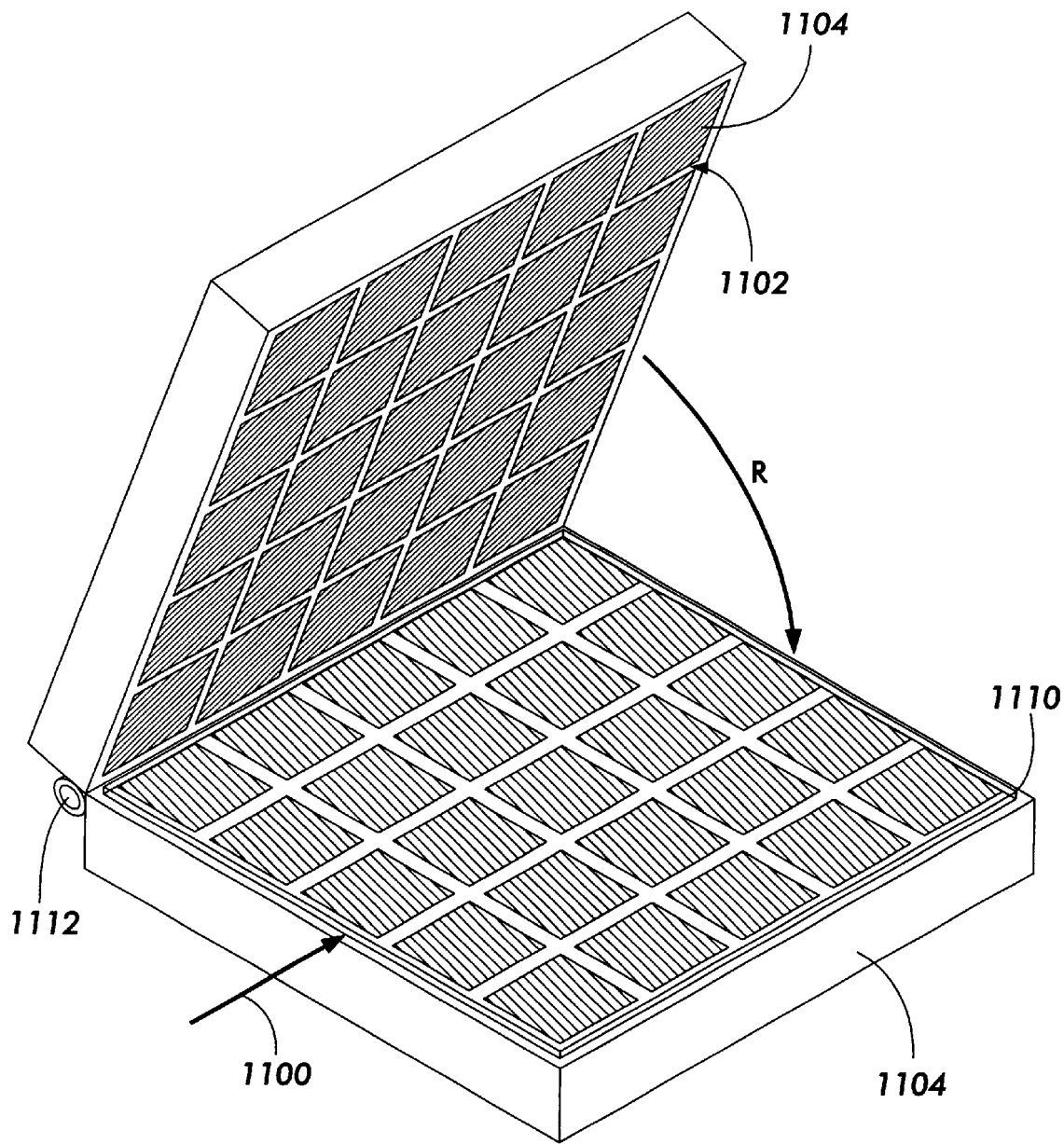
FIG. 11 is a perspective view of a gyricon sheet, according to the present invention, showing a two dimensionally arrayed charge transfer device.

A two-dimensional array of addressing elements is envisioned that addresses entire sheets of electric paper. FIG. 11 shows such a device, called a charge transfer platen 1100. A sheet of electric paper 1110 is temporarily positioned inside a device with a supporting base 1104 and a two-dimensional matrix addressing array 1102 of addressing elements 1104. The matrix addressing array 1102 can be positioned in contact with or in proximity to the electric paper 1110. In the figure the matrix array is shown being rotated about a hinge 1112 through an arc R into position above the electric paper 1110. Charge is transferred to all the charge retaining islands 1112 simultaneously, an image is created, and the electric paper 1110 can be removed. Hybrid plate-wand configurations are also conceivable which might provide a compromise between cost and performance provided by the two approaches.

Figure 12:
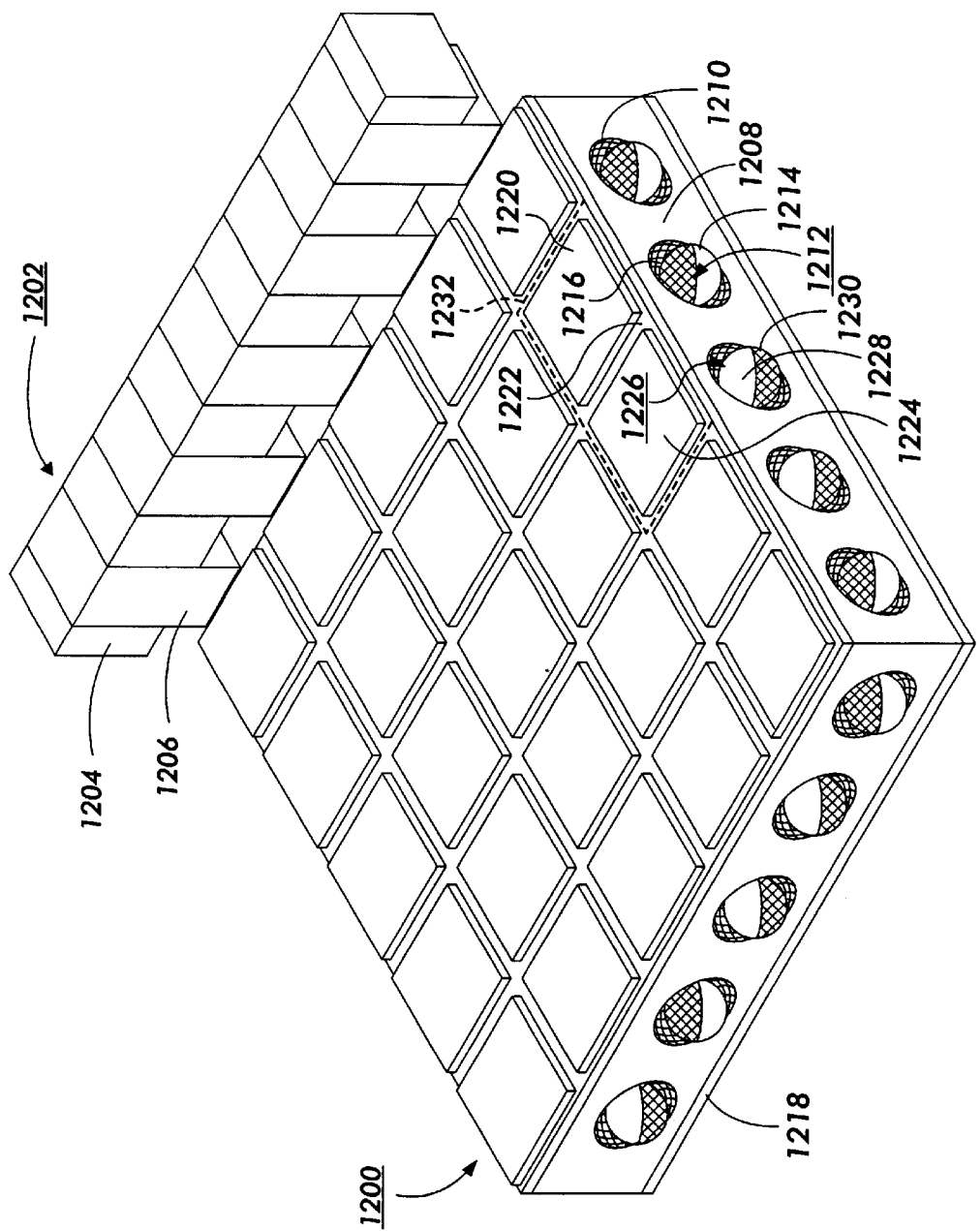
FIG. 12 is the gyricon device shown in FIG. 10 illustrating a pixel with two subpixels.

The charge retaining islands technique, described above, can also be used to implement a gyricon with grey scales, highlight color, additive full color, or custom colors using only simple bichromal rotating elements. FIG. 12 shows a portion of a gyricon sheet 1200 with an arrayed charge transfer device 1202 containing alternating portions of a insulating element 1204 and a charge transfer element 1206 as described earlier. The gyricon sheet 1200 comprises a retaining medium 1208 with fluid filled cavities 1210, wherein each cavity contains a rotating element such as rotating element 1212 which is divided into two different portions 1214, 1216, each portion having an optical characteristic. One surface of the gyricon sheet 1200 is covered with a conductive material 1218 to provide an equipotential surface while the other surface of the gyricon sheet 1200 is covered with an array of charge retaining islands 1220, 1224 separated by dielectric channels 1222. It should be noted that this particular configuration is used for illustrative purposes only and the foregoing described variations in charge transfer devices and construction of charge retaining islands and equipotential surface are also applicable. Also, while FIG. 12 shows only one rotating element associated with each charge retaining island (for example rotating element 1212 is associated with charge retaining island 1220 and rotating element 1226 is associated with charge retaining island 1224), in practice it would be more likely that many rotating elements would be associated with a given charge retaining island. In such instances, the rotating elements can be arranged in any pattern such as close packed array or a random distribution as is already known in the art. Furthermore, while the rotating elements 1212 are shown as bichromal spheres in this drawing, they need not be spheres but might also be bichromal cylinders as described in U.S. patent application Ser. No. 08/716,672 by Sheridon et.al. filed Sep. 13$^{th}$, 1996, assigned to the same assignee and herein incorporated by reference (D/92105).

To implement a pixel addressable gyricon with improved grey scale, a pixel 1232 would contain an area associated with at least two charge retaining islands 1220, 1224. Although only two charge retaining islands 1220, 1224 are shown as belonging to pixel area 1232 it is feasible that a given pixel area might include many charge retaining islands. Each charge retaining island 1220, 1224 is likewise associated with a bichromal rotating element 1212, 1226 and defines a separately addressable subpixel area of pixel 1232 which can be addressed by the charge transfer device 1202.

If the two different portions 1214, 1216 of rotating element 1212 have the optical characteristics of white and black, respectively, and the two different portions 1228, 1230 of rotating element 1226 have the optical characteristics of white and black, respectively, then pixel 1232 can be used to display three grey scale values by selecting both subpixels to be white, one subpixel to be white while the other is black, or both subpixels to be black. By extension, using many pixels together, the gyricon can display a wider range of grey scale values by selecting a combination of pixels where each pixel displays one of the three values described above.

Figure 12A:
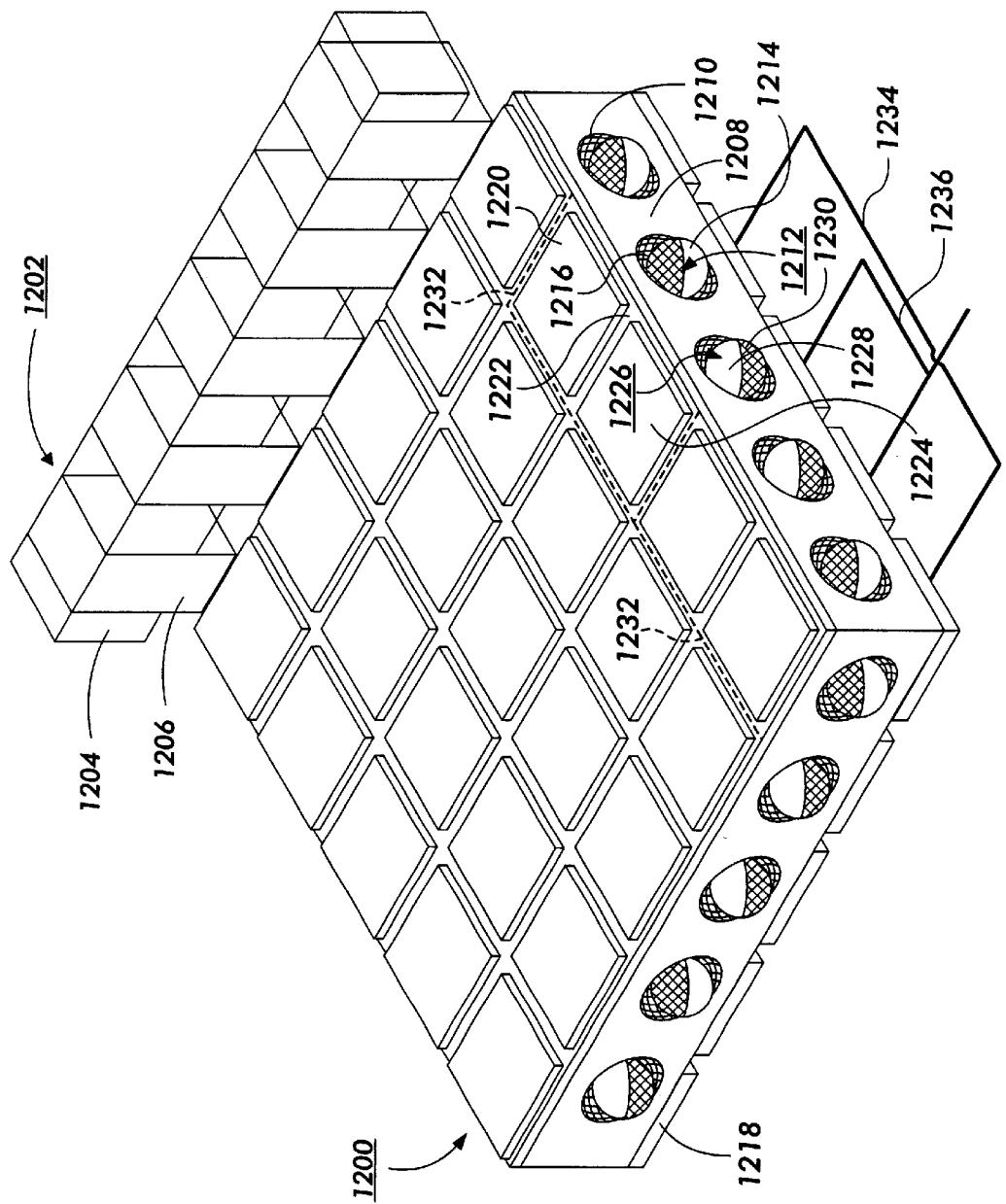

To make addressing of subpixels easier the equipotential surface 1218 can be patterned as shown in FIG. 12A. If the equipotential surface 1218 is also patterned then the regions associated with particular subpixels can be electrically tied together by electrical lines 1234, 1236. Providing the appropriate electrical potential on electrical lines 1234, 1236 allows for simultaneous selection of particular subpixels to be addressed by the charge transfer device while preventing addressing of other subpixels.

Grey scale implementation however is not limited to the example above, for instance if the two different portions 1214, 1216 of rotating element 1212 have the optical characteristics of white and black, respectively, and the two different portions 1228, 1230 of rotating element 1226 have the optical characteristics of white and some intermediate value of grey, respectively, then pixel 1232 can be used to display 4 grey scale values by selecting both subpixels to be white, one subpixel to be white while the other is either black or grey, or one subpixel to be grey while the other subpixel is black. By extension, using many pixels together, the gyricon can display a wider range of grey scale values by selecting a combination of pixels where each pixel displays one of the four values described above. However, this implementation may result in some loss of saturation for black as both subpixels can not be selected for black.

Conversely, if the two different portions 1228, 1230 of rotating element 1226 have the optical characteristics of black and some intermediate value of grey, respectively, then pixel 1232 can also be used to display 4 grey scale values, however, this implementation may result in some loss of brightness as both subpixels can not be selected for white. This approach can also be extrapolated to many combinations of subpixels wherein each subpixel contains some combination of black, white, and intermediate grey values.

This approach is also extendible to provide highlight color. For instance if the two different portions 1214, 1216 of rotating element 1212 have the optical characteristics of white and black, respectively, and the two different portions 1228, 1230 of rotating element 1226 have the optical characteristics of white and some other color, for instance red, respectively, then pixel 1232 can be used to display 4 color values by selecting both subpixels to be white, one subpixel to be white while the other is either black or red, or one subpixel to be red while the other subpixel is black. This would allow for instance the display of red text or red underline.

Highlight color could also be used in dedicated areas of the gyricon. For instance, the pixel 1232 might be located in an area of the sheet where a company logo is expected to be displayed. In such a case the two different portions 1214, 1216 of rotating element 1212 and the two different portions 1228, 1230 of rotating element 1226 have the optical characteristics of the colors of the company logo. Taking as an example, the "red digital X" displayed on a white background used by Xerox Corporation, the two different portions 1214, 1216 of rotating element 1212 have the optical characteristics of white and red, respectively, and the two different portions 1228, 1230 of rotating element 1226 are also colored with white and red, respectively. In this case, the pixels in that portion of the gyricon containing the red and white coloration could be used to display the "red digital X" on a white background while the remainder of the gyricon can be used to display black and white text.

Figure 13:
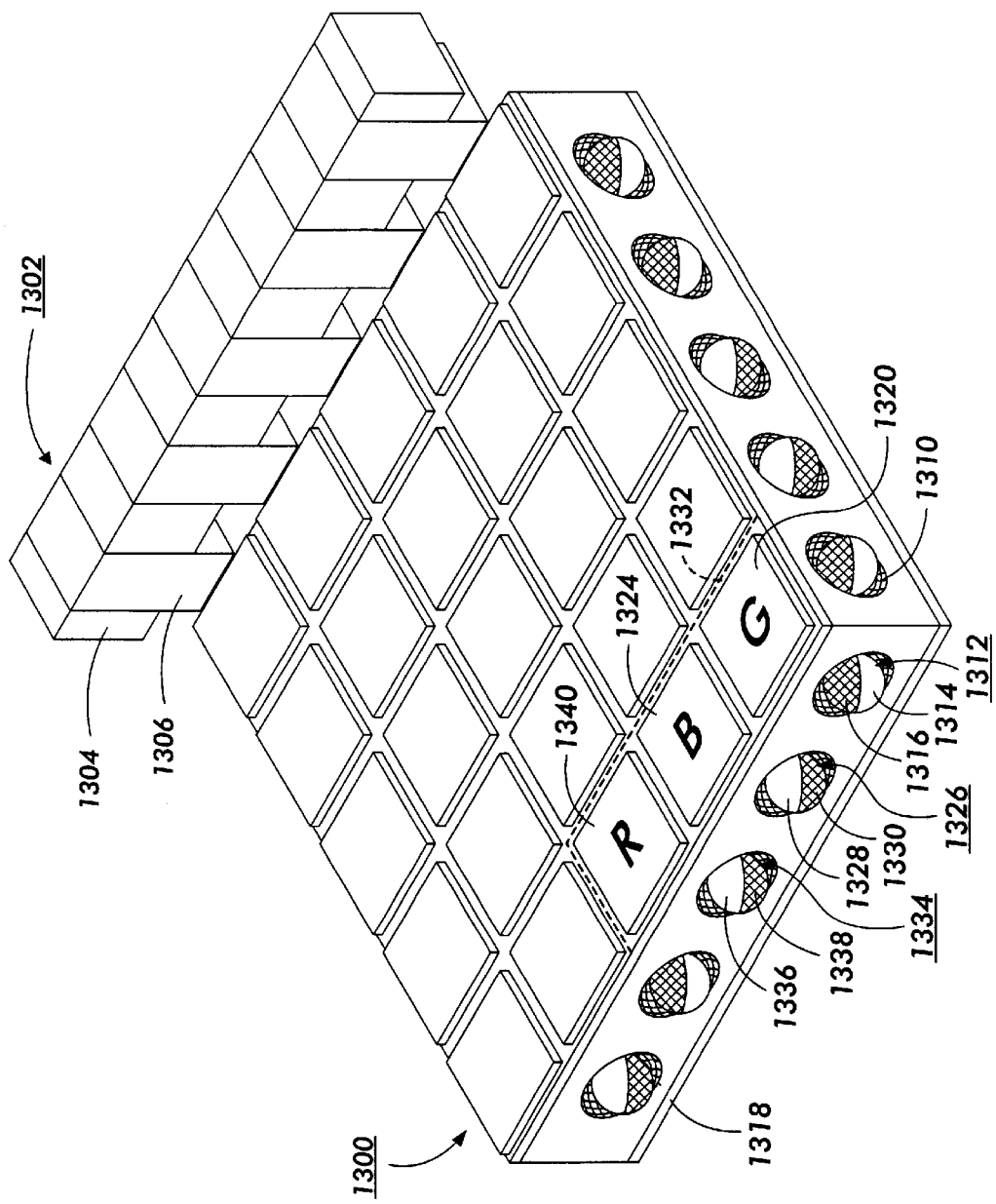
FIG. 13 is the gyricon device shown in FIG. 10 illustrating a pixel with three subpixels.

The charge retaining islands technique can also be used to implement a additive full color gyricon using only simple bichromal rotating elements. FIG. 13 shows a portion of a gyricon sheet 1300 with an arrayed charge transfer device 1302 containing alternating portions of a insulating element 1304 and a transfer element 1306 as described earlier. The gyricon sheet 1300 comprises a retaining medium 1308 with fluid filled cavities 1310, wherein each cavity contains a rotating element such as rotating element 1312 which is divided into two different portions 1314, 1316. One surface of the gyricon sheet 1300 is covered with a conductive material 1318 to provide an equipotential surface while the other surface of the gyricon sheet 1300 is covered with an array of charge retaining islands 1320, 1324 separated by dielectric channels 1322. It should be noted that this particular configuration is used for illustrative purposes only and the foregoing described variations in charge transfer devices and construction of charge retaining islands and equipotential surface are also applicable. Also, while FIG. 13 shows only one rotating element associated with each charge retaining island (for example rotating element 1312 is associated with charge retaining island 1320), in practice it would be more likely that many rotating elements would be associated with a given charge retaining island. In such instances, the rotating elements can be arranged in any pattern such as close packed array or a random distribution. Furthermore, while the rotating elements 1312 are shown as bichromal spheres in this drawing, they need not be spheres but might also be bichromal cylinders.

To implement a pixel addressable gyricon with additive full color, analagous to a TV display or an LCD display a pixel 1332 would contain an area associated with at least three charge retaining islands 1320, 1234, 1340. Although only three charge retaining islands 1320, 1324, 1340 are shown as belonging to pixel area 1332 it is feasible that a given pixel area might include many charge retaining islands. Each charge retaining island 1320, 1324, 1340 is likewise associated with a bichromal rotating element 1312, 1326, 1334 respectively and defines a separately addressable subpixel area of pixel 1332 which can be addressed by the charge transfer device 1302.

If the two different portions 1314, 1316 of rotating element 1312 have the optical characteristics of white and green, respectively, the two different portions 1328, 1330 of rotating element 1326 have the optical characteristics of white and blue, respectively, and the two different portions, 1336, 1338 of rotating element 1334 have the optical characteristics of white and red, respectively then pixel 1332 can be used to display additive full color images. Just as in a TV display or an LCD display specific colors are chosen by selecting different portions of pixel 1332. For instance, if a red pixel is desired, then rotating element 1334 will be positioned by the charge transfer device to show it's red portion while rotating elements 1326 and 1312 will be positioned to show their white portions. Similarly, if a green pixel is desired, then rotating element 1312 will be positioned by the charge transfer device to show it's green portion while rotating elements 1326 and 1334 will be positioned to show their white portions. The gyricon can then display a wide range of colors by using many pixels together and selecting a combination of pixels where each pixel displays either red, blue, green, or white. However, the disadvantage to this arrangement is that black is not available.

The gyricon system can be used to display additive full color and black by using a different selection of rotating elements. To implement a pixel addressable gyricon with additive full color plus black the two different portions 1314, 1316 of rotating element 1312 have the optical characteristics of black and green, respectively, the two different portions 1328, 1330 of rotating element 1326 have the optical characteristics of black and blue, respectively, and the two different portions, 1336, 1338 of rotating element 1334 have the optical characteristics of black and red, respectively. Just as in a TV display or an LCD display specific colors are chosen by selecting different portions of pixel 1332. For instance, if a red pixel is desired, then rotating element 1334 will be positioned by the charge transfer device to show its red portion while rotating elements 1326 and 1312 will be positioned to show their black portions. Similarly, if a green pixel is desired, then rotating element 1312 will be positioned by the charge transfer device to show its green portion while rotating elements 1326 and 1334 will be positioned to show their black portions. If a white pixel is desired, then rotating element 1312 will be positioned by the charge transfer device to show it's green portion while rotating elements 1326 and 1334 will be positioned to show their blue and red portions, respectively. If a black pixel is desired then all three rotating elements 1312, 1324, 1334 are positioned to show their black portions. This configuration has the advantage of displaying a full range of colors plus black, however, it has the disadvantage of providing a less bright white as compared to the configuration described above.

To make addressing of subpixels easier the equipotential surface can be patterned. If the equipotential surface is also patterned then the regions associated with particular subpixels can be electrically tied together by electrical lines. Providing the appropriate electrical potential on the electrical lines allows for simultaneous selection of particular subpixels to be addressed by the charge transfer device while preventing addressing of other subpixels. For instance, all the subpixel regions associated with a particular color, for instance red, can be tied together.

Figure 14:
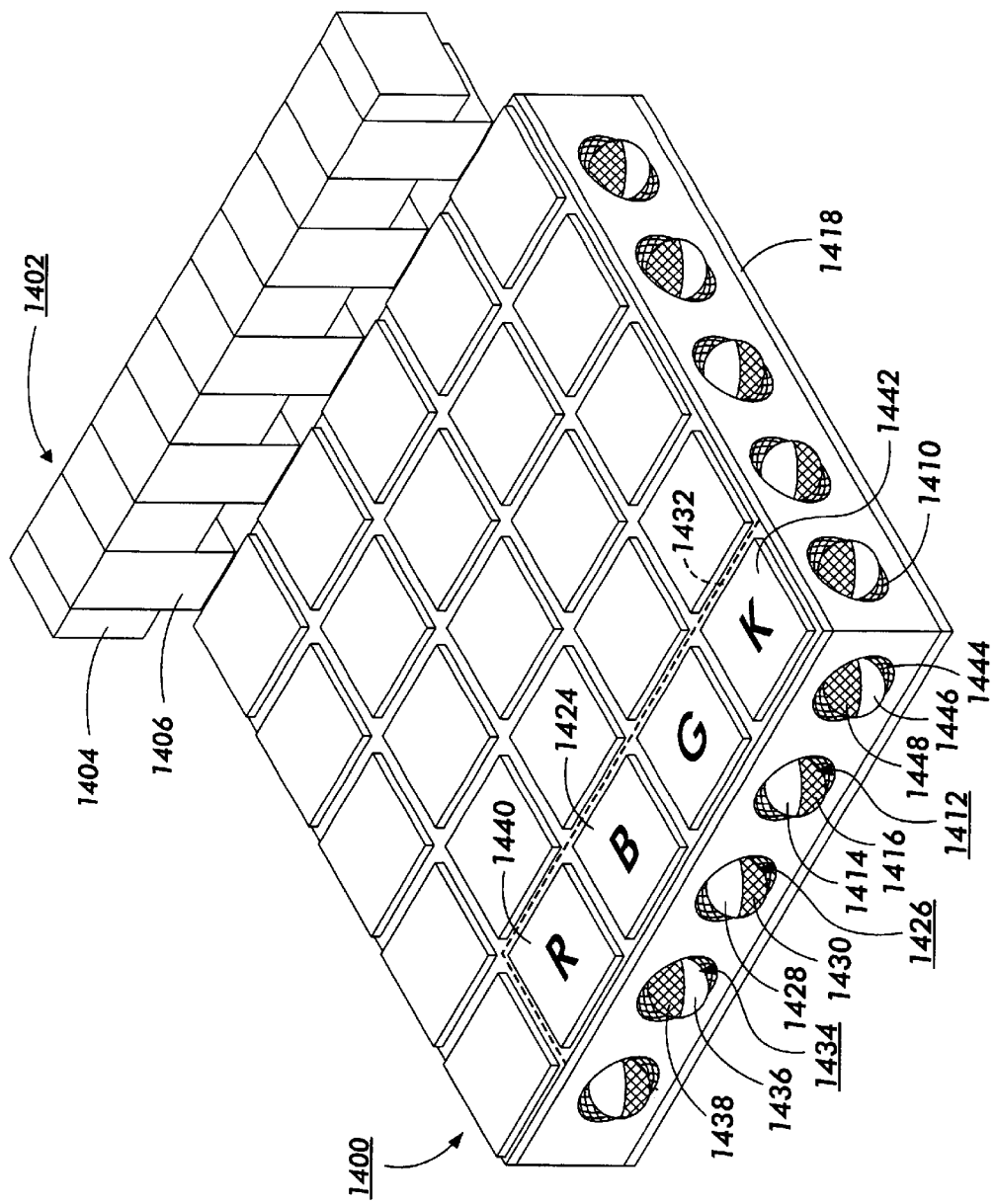
FIG. 14 is the gyricon device shown in FIG. 10 illustrating a pixel with four subpixels.

A full color additive system can be configured with both a reasonably bright white and black as shown in FIG. 14. FIG. 14 shows a portion of a gyricon sheet 1400 with an arrayed charge transfer device 1402 containing alternating portions of a insulating element 1404 and a transfer element 1406 as described earlier. The gyricon sheet 1400 comprises a retaining medium 1408 with fluid filled cavities 1410, wherein each cavity contains a rotating element such as rotating element 1412 which is divided into two different portions 1414, 1416. One surface of the gyricon sheet 1400 is covered with a conductive material 1418 to provide an equipotential surface while the other surface of the gyricon sheet 1400 is covered with an array of charge retaining islands 1420, 1424 separated by dielectric channels 1422. It should be noted that this particular configuration is used for illustrative purposes only and the foregoing described variations in charge transfer devices and construction of charge retaining islands and equipotential surface are also applicable. Also, while FIG. 14 shows only one rotating element associated with each charge retaining island (for example rotating element 1412 is associated with charge retaining island 1420), in practice it would be more likely that many rotating elements would be associated with a given charge retaining island. In such instances, the rotating elements can be arranged in any pattern such as close packed array or a random distribution. Furthermore, while the rotating elements 1312 are shown as bichromal spheres in this drawing, they need not be spheres but might also be bichromal cylinders.

In this implementation a pixel 1432 would contain an area associated with at least four charge retaining islands 1420, 1434, 1440, 1442. Although only four charge retaining islands 1420, 1424, 1440, 1442 are shown as belonging to pixel area 1432 it is feasible that a given pixel area might include many charge retaining islands. Each charge retaining island 1420, 1424, 1440, 1442 is likewise associated with a bichromal rotating element 1412, 1426, 1434, 1444 respectively and defines a separately addressable subpixel area of pixel 1432 which can be addressed by the charge transfer device 1402.

One portion 1414, 1428, 1436, 1446 of each of the rotating elements 1412, 1426, 1434, 1444 is colored white and the other portion 1416, 1430, 1438, 1448 of each of the rotating elements 1412, 1426, 1434, 1444 is colored green, blue, red, and black respectively. Specific colors are again chosen by selecting different portions of pixel 1432. For instance, if a red pixel is desired, then rotating element 1434 will be positioned by the charge transfer device to show it's red portion while the remaining rotating elements 1426 1412, and 1444 will be positioned to show their white portions. Similarly, if a green pixel is desired, then rotating element 1412 will be positioned by the charge transfer device to show it's green portion while the remaining rotating elements 1426, 1434, and 1442 will be positioned to show their white portions. The gyricon can then display a wide range of colors by using many pixels together and selecting a combination of pixels where each pixel displays either red, blue, green, black or white. Black can be selected in a similar manner by rotating element 1444 to show its black portion while the remaining elements 1412, 1426, and 1434 can be rotated to show their white portions. White can be selected by rotating all four rotating elements 1412, 1426, 1434, and 1444 to show their white portions. While this arrangement has the advantage of providing both black and a good bright white over the previous configurations, however it has the possible disadvantage of providing less color saturation than those configurations due to the extra subpixel used.

Figure 15:
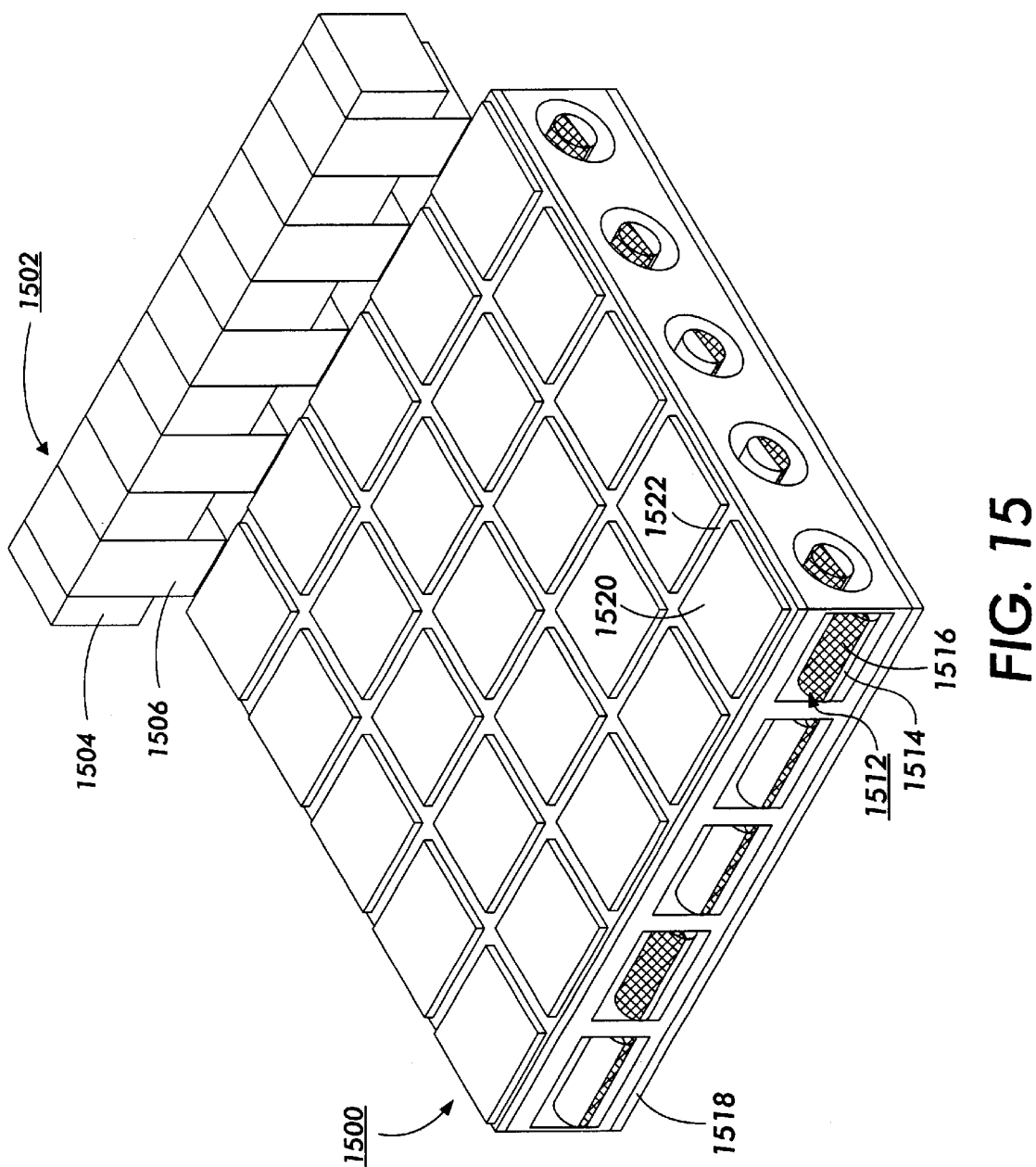
FIG. 15 is the gyricon device shown in FIG. 10 illustrating cylindrical rotational elements.

Any of the systems described above can be implemented with cylindrical elements for the bichromal rotational elements as shown in FIG. 15. FIG. 15 shows a portion of a gyricon sheet 1500 with an arrayed charge transfer device 1502 containing alternating portions of a insulating element 1504 and a transfer element 1506 as described earlier. The gyricon sheet 1500 comprises a retaining medium 1508 with fluid filled cavities 1510, wherein each cavity contains a rotating element such as rotating element 1512 which is divided into two different portions 1514, 1516. One surface of the gyricon sheet 1500 is covered with a conductive material 1518 to provide an equipotential surface while the other surface of the gyricon sheet 1500 is covered with an array of charge retaining islands 1520 separated by dielectric channels 1522. It should be noted that this particular configuration is used for illustrative purposes only and the foregoing described variations in charge transfer devices and construction of charge retaining islands and equipotential surface are also applicable. Also, while FIG. 15 shows only one rotating element associated with each charge retaining island (for example rotating element 1512 is associated with charge retaining island), in practice it would be more likely that many rotating elements would be associated with a given charge retaining island. A gyricon constructed as above could be used in any of the implementations shown in FIGS. 12–14. Selection of subpixel areas and operation would be identical, however the substitution of cylindrical particles should result in a gyricon display with better brightness and color saturation due to the higher packing densities available with cylindrical particles.

It also bears noting that the principles described which have shown how to implement systems using the optical characteristics of color and grey scale can be extended to any number of optical characteristics such as polarization, birefringence, phase retardation, light scattering, and light reflection. In general, the rotating elements can be used to modulate light in a wide variety of ways.

What is claimed is:

1. A display material having two opposing outer surfaces wherein at least one of the outer surfaces is at least partially covered in a plurality of spaced apart charge retaining islands comprised of a conductive material with areas of insulating material interposed therebetween wherein the conductive material and the insulating material together comprise a z-axis only conductive material and the spaced apart charge retaining islands are integral with the outer surface.

2. The material of claim 1 further comprising a retaining medium with a plurality of rotatable, optically anisotropic particles contained within dielectric liquid filled cavities therein, said particles having at least two optical modulation characteristics and an electrical anisotropy such that when an electric field is applied across said particles said particles will rotate such that one optical modulation characteristic is viewable by an observer situated to observe the surface of the retaining medium.

3. The material of claim 2 wherein the rotatable particles are substantially spherical.

4. The material of claim 2 wherein the rotatable particles are substantially cylindrical.

5. The material of claim 1 further comprising means for protection against inadvertant tribo-charge writing on the other outer surface.

6. The material of claim 5 wherein the means for protection against inadvertant tribo-charge writing on the other outer surface comprises an at least a partially laterally conductive layer.

7. The material of claim 6 wherein the at least partially laterally conductive layer comprises metal.

8. The material of claim 7 where the metal is indium tin oxide.

9. The material of claim 7 where the metal is chrome.

10. The material of claim 7 where the metal is aluminum.

11. The material of claim 6 wherein the at least partially laterally conductive layer is a z-axis only conductive material and the spaced apart charge retaining islands are integral with the outer surface.

12. The material of claim 6 wherein the at least partially laterally conductive material is substantially laterally conductive.

13. The material of claim 6 wherein the at least partially laterally conductive material comprises at least two portions of conductive material substantially electrically separated from each other.

14. The material of claim 13 wherein one of the at least two portions of conductive material is associated with a first set of optical characteristics and another of the at least two portions of conductive material is associated with a second set of optical characteristics.

15. The material of claim 14 wherein a set of optical characteristics comprises at least two different optical characteristics.

16. The material of claim 14 wherein the portion of conductive material associated with said first set of optical characteristics is comprised of a plurality of conductive areas which may be electrically connected together.

17. The material of claim 14 wherein the portion of conductive material associated with said second set of optical characteristics is comprised of a plurality of conductive areas which may be electrically connected together.

18. The material of claim 14 wherein there are at least three portions of conductive material substantially electrically separated from each other and one of the portions is associated with a third set of optical characteristics.

19. The material of claim 18 wherein at least two of the sets of optical characteristics are different from each other.

20. The material of claim 19 wherein the first, second, and third sets of optical characteristics are different from each other.

21. The material of claim 18 wherein at least one of the portions of conductive material is comprised of a plurality of conductive areas which may be electrically connected together.

22. The material of claim 1 further comprising means for at least temporarily retaining an electric charge on the other outer surface.

23. The material of claim 22 wherein the means for at least temporarily retaining charge comprises a plurality of spaced apart charge retaining islands substantially electrically separated from each other.

24. The material of claim 23 wherein the spaced apart charge retaining islands are arranged in a regular pattern.

25. The material of claim 23 wherein the spaced apart charge retaining islands are randomly arranged.

26. The material of claim 22 wherein the means for retaining an electric charge on selected portions is light transmissive.

27. The material of claim 22 further comprising means for transferring charge to the means for retaining an electric charge.

28. The material of claim 27 wherein the means for transferring charge comprises a contact charging device.

29. The material of claim 27 wherein the means for transferring charge comprises an ionographic charging device.

30. The material of claim 27 wherein the means for transferring charge comprises a point stylus device.

31. The material of claim 27 wherein the means for transferring charge comprises an arrayed device.

32. The material of claim 27 wherein the means for transferring charge comprises a two dimensionally array device.

33. A display material having two opposing outer surfaces comprising a retaining medium with a plurality of rotatable, optically anisotropic particles contained within dielectric liquid filled cavities therein, said particles having at least two optical modulation characteristics and an electrical anisotropy such that when an electric field is applied across said particles said particles will rotate such that at least a portion of one optical modulation characteristic is viewable by an observer situated to observe the surface of the retaining medium wherein at least one of the outer surfaces has a means for retaining an electric charge on selected portions of said at least one of the outer surfaces.

34. The material of claim 33 wherein the rotatable particles are substantially spherical.

35. The material of claim 33 wherein the rotatable particles are substantially cylindrical.

36. The material of claim 33 further comprising means for protection against inadvertant tribo-charge writing on the other outer surface.

37. The material of claim 36 wherein the means for protection against inadvertant tribo-charge writing on the other outer surface comprises an at least partially conductive layer.

38. The material of claim 37 wherein the at least partially laterally conductive layer comprises metal.

39. The material of claim 38 where the metal is indium tin oxide.

40. The material of claim 38 where the metal is chrome.

41. The material of claim 38 where the metal is aluminum.

42. The material of claim 37 wherein the at least partially laterally conductive material is substantially laterally conductive.

43. The material of claim 37 wherein the at least partially laterally conductive material comprises at least two portions of conductive material substantially electrically separated from each other.

44. The material of claim 43 wherein one of the at least two portions of conductive material is associated with a first set of optical characteristics and another of the at least two portions of conductive material is associated with a second set of optical characteristics.

45. The material of claim 44 wherein a set of optical characteristics comprises at least two different optical characteristics.

46. The material of claim 44 wherein the portion of conductive material associated with said first set of optical characteristics is comprised of a plurality of conductive areas which may be electrically connected together.

47. The material of claim 44 wherein the portion of conductive material associated with said second set of optical characteristics is comprised of a plurality of conductive areas which may be electrically connected together.

48. The material of claim 44 wherein there are at least three portions of conductive material substantially electrically separated from each other and one of the portions is associated with a third set of optical characteristics.

49. The material of claim 48 wherein at least two of the sets of optical characteristics are different from each other.

50. The material of claim 49 wherein the first, second, and third sets of optical characteristics are different from each other.

51. The material of claim 48 wherein at least one of the portions of conductive material is comprised of a plurality of conductive areas which may be electrically connected together.

52. The material of claim 33 wherein said means for retaining an electric charge on selected portions of said at least one outer surface comprises at least two portions of conductive material substantially electrically separated from each other.

53. The material of claim 52 wherein the laterally conductive layer comprises a plurality of spaced apart charge retaining islands.

54. The material of claim 53 wherein the spaced apart charge retaining islands are arranged in a regular pattern.

55. The material of claim 53 wherein the spaced apart charge retaining islands are randomly arranged.

56. The material of claim 53 wherein the at least two portions of conductive material comprise substantially electrically separated from each other comprise a z-axis only conductive material.

57. The material of claim 53 wherein the conductive material comprises a metal.

58. The material of claim 57 wherein the metal comprises indium tin oxide.

59. The material of claim 57 wherein the metal comprises chrome.

60. The material of claim 57 wherein the metal comprises aluminum.

61. The material of claim 33 wherein the means for retaining an electric charge on selected portions is light transmissive.

62. The material of claim 33 further comprising means for transferring charge to the means for retaining an electric charge.

63. The material of claim 62 wherein the means for transferring charge comprises a contact charging device.

64. The material of claim 62 wherein the means for transferring charge comprises an ionographic charging device.

65. The material of claim 62 wherein the means for transferring charge comprises a point stylus device.

66. The material of claim 62 wherein the means for transferring charge comprises an arrayed device.

67. The material of claim 62 wherein the means for transferring charge comprises a two dimensional array device.

68. A display media having two opposed external surfaces, at least one of which is a viewing surface, comprised of:
   a) a display material comprising at least one modifiable optical element,
   b) a first plurality of spaced apart charge retaining islands, substantially electrically separated from each other, at least partially covering one of the outer surfaces and affixed to the outer surface, and
   c) means for retaining the optical elements so configured and arranged such that said means for retaining provides the two external surfaces.

69. The display media of claim 68 wherein the spaced apart charge retaining islands are arranged in a regular pattern.

70. The display media of claim 68 wherein the spaced apart charge retaining islands are randomly arranged.

71. The display media of claim 68 wherein the spaced apart charge retaining island are comprised of a conductive material.

72. The display media of claim 71 where the conductive material is indium tin oxide.

73. The display media of claim 71 where the conductive material is chrome.

74. The display media of claim 71 where the conductive material is aluminum.

75. The display media of claim 68 further comprising means for protection against inadvertant tribo-charge writing on the other external surface.

76. The display media of claim 75 wherein the means for protection against inadvertant tribo-charge writing on the other external surface comprises an at least a partially laterally conductive layer.

77. The material of claim 76 wherein the at least partially laterally conductive layer comprises metal.

78. The display media of claim 77 where the metal is indium tin oxide.

79. The material of claim 77 where the metal is chrome.

80. The display media of claim 77 where the metal is aluminum.

81. The material of claim 76 wherein the at least partially laterally conductive layer is anisotropically conductive.

82. The display media of claim 76 wherein the at least partially laterally conductive material is substantially laterally conductive.

83. The display media of claim 76 wherein the at least partially laterally conductive material comprises at least two portions of conductive material substantially electrically separated from each other.

84. The display media of claim 83 wherein the at least two portions of conductive material substantially electrically separated from each other comprises a z-axis only conductive material.

85. The display media of claim 83 wherein one of the at least two portions of conductive material is associated with a first set of optical characteristics and another of the at least two portions of conductive material is associated with a second set of optical characteristics.

86. The display media of claim 85 wherein a set of optical characteristics comprises at least two different optical characteristics.

87. The display media of claim 85 wherein the portion of conductive material associated with said first set of optical characteristics is comprised of a plurality of conductive areas which may be electrically connected together.

88. The display media of claim 85 wherein the portion of conductive material associated with said second set of optical characteristics is comprised of a plurality of conductive areas which may be electrically connected together.

89. The display media of claim 85 wherein there are at least three portions of conductive material substantially electrically separated from each other and one of the portions is associated with a third set of optical characteristics.

90. The display media of claim 89 wherein at least two of the sets of optical characteristics are different from each other.

91. The display media of claim 90 wherein the first, second, and third sets of optical characteristics are different from each other.

92. The display media of claim 89 wherein at least one of the portions of conductive material is comprised of a plurality of conductive areas which may be electrically connected together.

93. The display media of claim 76 wherein the laterally conductive layer comprises a plurality of spaced apart charge retaining islands substantially electrically separated from each other.

94. The display media of claim 93 wherein the spaced apart charge retaining islands are arranged in a regular pattern.

95. The display media of claim 93 wherein the spaced apart charge retaining islands are randomly arranged.

96. The display media of claim 68 wherein the plurality of modifiable optical elements comprise a plurality of rotatable, optically anisotropic particles contained within a dielectric liquid filled, said particles having at least two optical modulation characteristics and an electrical anisotropy such that when an electric field is applied across said particles said particles will rotate such that one optical modulation characteristic is viewable by an observer situated to observe the surface of the retaining medium.

97. The display media of claim 96 wherein the rotatable particles are substantially spherical.

98. The display media of claim 96 wherein the rotatable particles are substantially cylindrical.

* * * * *